(12) United States Patent
Urano et al.

(10) Patent No.: US 10,449,970 B2
(45) Date of Patent: Oct. 22, 2019

(54) VEHICLE CONTROL SYSTEM

(71) Applicant: TOYOTA JIDOSHA KABUSHIKI KAISHA, Toyota-shi, Aichi-ken (JP)

(72) Inventors: Hiromitsu Urano, Numazu (JP); Toshiki Kindo, Yokohama (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/722,333

(22) Filed: Oct. 2, 2017

(65) Prior Publication Data

US 2018/0105184 A1 Apr. 19, 2018

(30) Foreign Application Priority Data

Oct. 14, 2016 (JP) ................. 2016-202851

(51) Int. Cl.
| | |
|---|---|
| *B60W 50/08* | (2012.01) |
| *B60K 31/00* | (2006.01) |
| *B60W 30/09* | (2012.01) |
| *B60W 50/14* | (2012.01) |
| *G05D 1/00* | (2006.01) |
| *B60W 50/00* | (2006.01) |

(52) U.S. Cl.
CPC ....... *B60W 50/082* (2013.01); *B60K 31/0008* (2013.01); *B60W 30/09* (2013.01); *B60W 50/0098* (2013.01); *B60W 50/08* (2013.01); *B60W 50/14* (2013.01); *G05D 1/0061* (2013.01); *B60W 2050/0096* (2013.01); *B60W 2050/146* (2013.01); *G05D 2201/0213* (2013.01)

(58) Field of Classification Search
CPC .... B60W 50/082; B60W 50/14; B60W 30/09; B60K 31/0008
USPC .......................................................... 701/23
See application file for complete search history.

(56) References Cited

U.S. PATENT DOCUMENTS

| | | |
|---|---|---|
| 2010/0179715 A1 | 7/2010 | Puddy |
| 2012/0046817 A1 | 2/2012 | Kindo et al. |
| 2012/0277947 A1 | 11/2012 | Boehringer et al. |
| 2013/0110343 A1 | 5/2013 | Ichikawa et al. |
| 2014/0156133 A1 | 6/2014 | Cullinane et al. |
| 2015/0057834 A1 | 2/2015 | Morimoto |
| 2015/0283998 A1 | 10/2015 | Lind et al. |

(Continued)

FOREIGN PATENT DOCUMENTS

| | | |
|---|---|---|
| JP | 2003-205805 A | 7/2003 |
| JP | 2008-049888 A | 3/2008 |

(Continued)

*Primary Examiner* — Krishnan Ramesh
(74) *Attorney, Agent, or Firm* — Sughrue Mion, PLLC

(57) ABSTRACT

A vehicle control system is configured to switch a driving mode of a vehicle among an automatic driving mode, a transition mode, and a manual driving mode. The vehicle control system includes: a notification device and an electronic control unit. The notification device is configured to notify the driver of information. The electronic control unit is configured to recognize a vehicle state of the vehicle, and notify, by using the notification device, the driver of a reason for switching the driving mode to the transition mode, when the driving mode is switched from the automatic driving mode or the manual driving mode to the transition mode based on the vehicle state.

20 Claims, 7 Drawing Sheets

(56) References Cited

U.S. PATENT DOCUMENTS

| | | |
|---|---|---|
| 2016/0031441 A1 | 2/2016 | Foley |
| 2016/0039428 A1 | 2/2016 | Odate |
| 2016/0103449 A1 | 4/2016 | Desnoyer et al. |
| 2017/0294120 A1 | 10/2017 | Ootsuji |
| 2018/0072315 A1* | 3/2018 | Enthaler ............... B60W 50/14 |
| 2018/0088572 A1 | 3/2018 | Uchida et al. |

FOREIGN PATENT DOCUMENTS

| | | |
|---|---|---|
| JP | 2010-512592 A | 4/2010 |
| JP | 2010-264829 A | 11/2010 |
| JP | 2011-131838 A | 7/2011 |
| JP | 2011-162132 A | 8/2011 |
| JP | 2013-507673 A | 3/2012 |
| JP | 5382218 B2 | 10/2013 |
| JP | 2016-504232 A | 2/2016 |
| JP | 2016-028927 A | 3/2016 |
| JP | 2016-038846 A | 3/2016 |
| JP | 2016-137819 A | 8/2016 |
| WO | 2011/158347 A1 | 12/2011 |
| WO | 2013153660 A1 | 10/2013 |
| WO | 2015/162764 A | 10/2015 |
| WO | 2016080070 A1 | 5/2016 |

\* cited by examiner

VEHICLE CONTROL SYSTEM

INCORPORATION BY REFERENCE

The disclosure of Japanese Patent Application No. 2016-202851 filed on Oct. 14, 2016 including the specification, drawings and abstract is incorporated herein by reference in its entirety.

BACKGROUND

1. Technical Field

The present disclosure relates to a vehicle control system.

2. Description of Related Art

A system for causing a vehicle to travel automatically is disclosed in Japanese Patent Application Publication No. 2010-264829 (JP 2010-264829 A). This publication describes a system that can execute an automatic driving mode (an automatic traveling mode) in which a vehicle travels automatically, a manual driving mode in which a driver manually drives the vehicle, and a transition mode which is different from the automatic driving mode and the manual driving mode.

SUMMARY

In the above-mentioned system, when a traveling state of the vehicle or the like satisfies predetermined conditions in the automatic driving mode, the driving mode of the vehicle is switched to the transition mode. At this time, in the above-mentioned system, a lamp for notifying a driver of switching to the transition mode is turned on, but the driver is not notified of the reason for switching to the transition mode. There is concern that the driver will not understand the situation and will not select a next action when the driver is merely notified of switching to a mode (for example, the transition mode described in JP 2010-264829 A) other than the automatic driving mode in which the driver does not need to drive the vehicle and the manual driving mode in which the driver needs to manually drive the vehicle.

The present disclosure provides a vehicle control system that can notify a driver of a reason for switching to a transition mode other than an automatic driving mode and a manual driving mode.

An aspect of the present disclosure provides a vehicle control system. The vehicle control system is configured to switch a driving mode of a vehicle among an automatic driving mode in which the vehicle travels by using a traveling plan created based on a predetermined target route, a transition mode in which the vehicle travels using cooperation between a driving operation of a driver of the vehicle and traveling control of causing the vehicle to travel by using the traveling plan, and a manual driving mode in which the vehicle travels based on an operation amount of the driving operation of the driver. The vehicle control system according to the aspect includes: a notification device configured to notify the driver of information; and at least one electronic control unit. The at least one electronic control unit is configured to recognize a vehicle state of the vehicle, and notify, by using the notification device, the driver of a reason for switching the driving mode to the transition mode, when the driving mode is switched from the automatic driving mode or the manual driving mode to the transition mode based on the vehicle state.

With this configuration, when the driving mode is switched from the automatic driving mode or the manual driving mode to the transition mode due to a vehicle state, it is possible to notify a driver of the reason for switching to the transition mode (a mode other than the automatic driving mode and the manual driving mode) based on the vehicle state of the vehicle. Accordingly, in the vehicle control system, since the driver can understand the reason for switching to the transition mode due to the vehicle state, the driver can appropriately select a next action in consideration of the reason for switching to the transition mode.

In the above aspect, the at least one electronic control unit may be configured to notify, when the driving mode is switched from the automatic driving mode or the manual driving mode to the transition mode, the driver of a necessary condition to switch the driving mode to the automatic driving mode.

In the above aspect, the at least one electronic control unit may be configured to notify, when the driving mode is switched from the transition mode to the automatic driving mode based on the vehicle state, the driver of a reason for switching the driving mode from the transition mode to the automatic driving mode by using the notification device and notify, when the driving mode is switched from the transition mode to the manual driving mode based on the vehicle state, the driver of a reason for switching the driving mode from the transition mode to the manual driving mode by using the notification device. With this configuration, when the driving mode is switched from the transition mode to the automatic driving mode due to the vehicle state, the driver can be notified of the reason for switching via the notification device and thus the driver can understand the reason for switching to the automatic driving mode. Similarly, with this configuration, when the driving mode is switched from the transition mode to the manual driving mode due to the vehicle state, the driver can be notified of the reason for switching via the notification device and thus the driver can understand the reason for switching to the manual driving mode. Accordingly, with this configuration, it is possible to deepen a driver's understanding of switching of a driving mode of a vehicle.

In the above aspect, the at least one electronic control unit may be configured to: recognize an occupant state of the vehicle; and notify, when the driving mode is switched from the automatic driving mode or the manual driving mode to the transition mode based on the occupant state, the driver of a reason for switching the driving mode to the transition mode by using the notification device based on the occupant state. With this configuration, when the driving mode is switched from the automatic driving mode or the manual driving mode to the transition mode due to the occupant state of the vehicle, it is possible to notify the driver of the reason for switching to the transition mode based on the occupant state. Accordingly, in the vehicle control system, since the driver can understand the reason for switching to the transition mode due to the occupant state of the vehicle, the driver can appropriately select a next action in consideration of the reason for switching to the transition mode.

In the above aspect, the at least one electronic control unit may be configured to notify, when the driving mode is switched from the transition mode to the automatic driving mode based on the occupant state, the driver of a reason for switching the driving mode from the transition mode to the automatic driving mode by using the notification device, and notify, when the driving mode is switched from the transition mode to the manual driving mode based on the occupant state, the driver of a reason for switching the driving mode from the transition mode to the manual driving mode by using the notification device. With this configuration, when the driving mode is switched from the transition mode to the automatic driving mode due to the occupant state, the driver can be notified of the reason for switching via the notification device and thus the driver can understand the reason for switching to the automatic driving mode. Similarly, with this configuration, when the driving mode is switched from the transition mode to the manual driving mode due to the occupant state, the driver can be notified of the reason for switching via the notification device and thus the driver can understand the reason for switching to the manual driving mode. Accordingly, it is possible to deepen a driver's understanding of switching of a driving mode of a vehicle.

In the above aspect, the at least one electronic control unit may be configured to evaluate an automatic driving mode familiarity level. The automatic driving mode familiarity level may be a degree of familiarity of the driver with the automatic driving mode. The at least one electronic control unit may be configured to change a notification style to the driver based on the automatic driving mode familiarity level. With this configuration, since the notification style for the driver is changed based on the automatic driving mode familiarity level which is a degree of the driver of familiarity with the automatic driving mode, a driver unfamiliar with the automatic driving mode can be satisfactorily notified. With this configuration, it is possible to prevent excessive notification from being given to a driver familiar with the automatic driving mode.

In the above aspect, the at least one electronic control unit may be configured to evaluate the automatic driving mode familiarity level, based on at least one of the number of times that the driver has executed the automatic driving mode and a time during which the vehicle has traveled in the automatic driving mode.

In the above aspect, the at least one electronic control unit may be configured to: when the vehicle travels in the automatic driving mode, determine whether the occupant state and the vehicle state satisfy a first condition and a second condition different from each other; maintain the automatic driving mode when the at least one electronic control unit determines that the first condition and the second condition are satisfied; switch the driving mode to the transition mode when one condition of the first condition and the second condition is satisfied and the other condition of the first condition and the second condition is not satisfied; switch the driving mode to the manual driving mode when neither of the first condition and the second condition is satisfied; notify the driver of a reason for switching the driving mode to the transition mode when the driving mode is switched to the transition mode; and notify the driver of a reason for switching to the manual driving mode when the driving mode is switched to the manual driving mode.

In the above aspect, the at least one electronic control unit may be configured to: when the vehicle travels in the manual driving mode, determine whether the occupant state and the vehicle state satisfy a first condition and a second condition different from each other; switch the driving mode to the automatic driving mode when the at least one electronic control unit determines that the first condition and the second condition are satisfied; switch the driving mode to the transition mode when one condition of the first condition and the second condition is satisfied and the other condition of the first condition and the second condition is not satisfied; maintain the manual driving mode when neither of the first condition and the second condition is satisfied; notify the driver of a reason for switching the driving mode to the transition mode when the driving mode is switched to the transition mode; and notify the driver of a reason for maintaining the manual driving mode when the manual driving mode is maintained.

In the above aspect, the notification style may include an amount of information notified to the driver by the notification device.

As described above, in the vehicle control system according to the aspects of the present disclosure, it is possible to notify a driver of a reason for switching to a transition mode other than an automatic driving mode and a manual driving mode.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, embodiments of the present disclosure will be described with reference to the accompanying drawings.

First Embodiment

Figure 1:
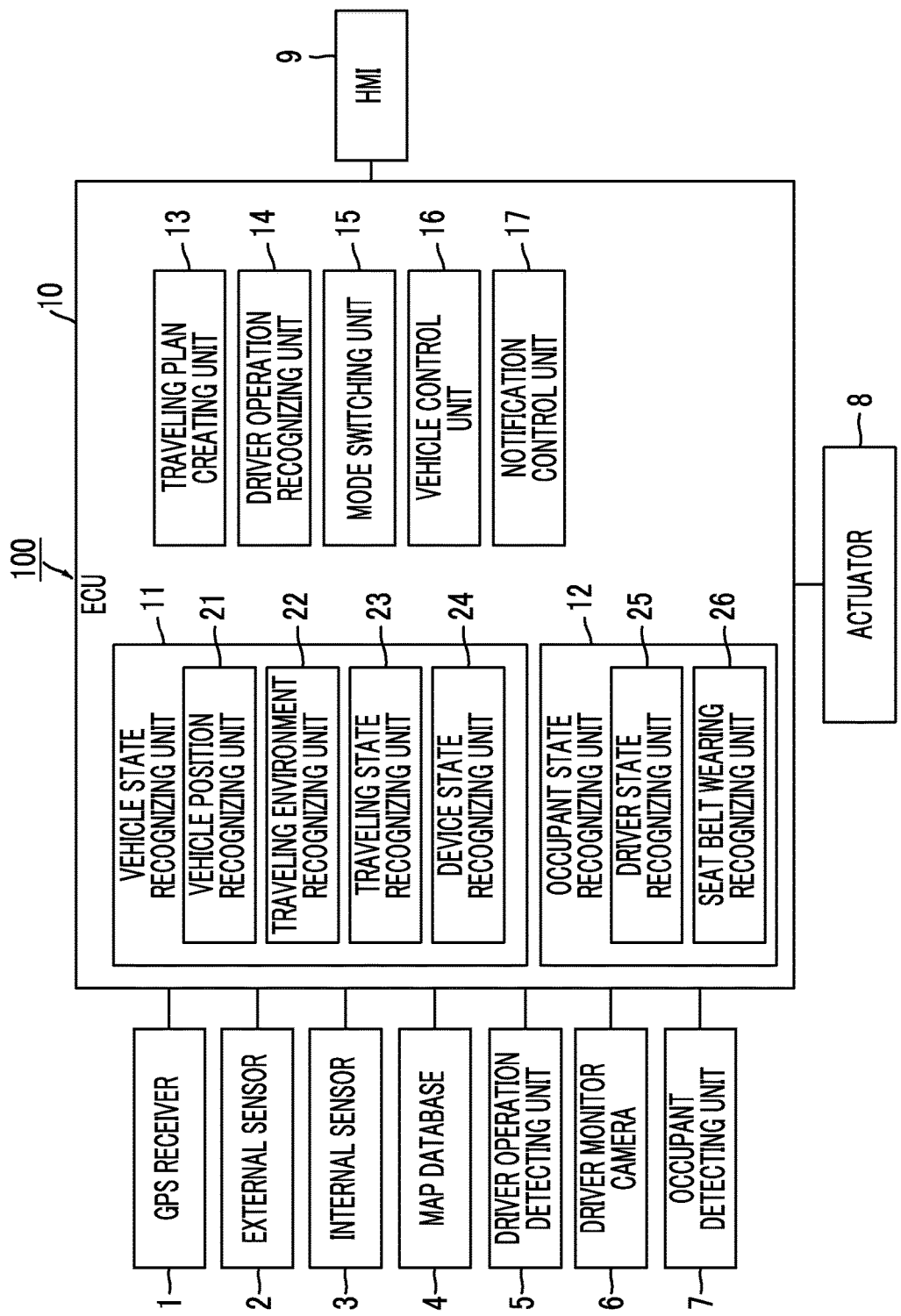
FIG. 1 is a block diagram illustrating a vehicle control system according to a first embodiment.

FIG. 1 is a block diagram illustrating a configuration of a vehicle control system 100 according to a first embodiment. The vehicle control system 100 illustrated in FIG. 1 is mounted in a vehicle such as an automobile and controls traveling of the vehicle. The vehicle control system 100 is configured to switch a driving mode of a vehicle to an automatic driving mode, a manual driving mode, and a transition mode.

An automatic driving mode is a mode in which a vehicle travels using a traveling plan which is created based on a predetermined target route. The target route and the traveling plan will be described later. In the automatic driving mode, a driver does not need to perform a driving operation and the vehicle travels automatically.

A manual driving mode is a mode in which a vehicle travels under a driver's manual operation. In the manual driving mode, an operation amount of a driver's driving operation (such as a steering operation amount, an accelerator operation amount, and a brake operation amount) is reflected in traveling of the vehicle.

A transition mode is a mode which is neither the automatic driving mode nor the manual driving mode. In the transition mode, a vehicle travels using cooperation between a driver's driving operation and traveling control. In the transition mode, a vehicle travels based on an operation amount of a driver's driving operation in a state in which a system can intervene. In the transition mode, when a driver does not perform a driving operation, the vehicle can be made to travel automatically. When a vehicle travels automatically in the transition mode, a driver may be encouraged to monitor a system.

<Configuration of Vehicle Control System According to First Embodiment>

As illustrated in FIG. 1, the vehicle control system 100 according to the first embodiment includes an electronic control unit (ECU) 10 that comprehensively controls the system. The ECU 10 is an electronic control unit including a central processing unit (CPU), a read only memory (ROM), a random access memory (RAM), and a controller area network (CAN) communication circuit. In the ECU 10, various functions are embodied, for example, by loading a program stored in the ROM into the RAM and causing the CPU to execute the program loaded into the RAM. The ECU 10 may be configured to include a plurality of electronic control units.

The ECU 10 is connected to a GPS receiver 1, an external sensor 2, an internal sensor 3, a map database 4, a driver operation detecting unit 5, a driver monitor camera 6, and an occupant detecting unit 7. The ECU 10 is also connected to an actuator 8 and a human-machine interface (HMI) 9.

The GPS receiver 1 measures a position of a vehicle (for example, latitude and longitude of the vehicle) by receiving signals from three or more GPS satellites. The GPS receiver 1 transmits the measured position information of the vehicle to the ECU 10.

The external sensor 2 is a detector that detects surrounding states around the vehicle. The external sensor 2 includes at least one of a camera and a radar sensor.

The camera is an imaging device that images outside conditions of the vehicle. The camera is disposed behind a front windshield of the vehicle. The camera transmits imaging information on the outside conditions of the vehicle to the ECU 10. The camera may be a monocular camera or a stereo camera. The stereo camera includes two imaging units that are disposed to reproduce binocular parallax. The imaging information of the stereo camera includes information in a depth direction.

The radar sensor detects an obstacle near the vehicle using radio waves (for example, radio waves of 1 to 10 millimeters) or light. The radar sensor detects an obstacle by transmitting radio waves or light to the surroundings of the vehicle and receiving radio waves or light reflected by the obstacle. The radar sensor transmits information on the detected obstacle to the ECU 10. Examples of the obstacle include a mobile obstacle such as a pedestrian, a bicycle, and another vehicle in addition to a fixed obstacle such as a guard rail and a building.

The internal sensor 3 is a detector that detects a traveling state of the vehicle. The internal sensor 3 includes a vehicle speed sensor, an acceleration sensor, and a yaw rate sensor. The vehicle speed sensor is a detector that detects a speed of the vehicle. For example, a wheel speed sensor that is disposed in a vehicle wheel, a drive shaft rotating integrally with the vehicle wheel, or the like and detects a rotation speed of the vehicle wheel is used as the vehicle speed sensor. The vehicle speed sensor transmits information on the detected vehicle speed (wheel speed information) to the ECU 10.

The acceleration sensor is a detector that detects an acceleration of the vehicle. The acceleration sensor includes a longitudinal acceleration sensor that detects an acceleration of the vehicle in a longitudinal direction and a lateral acceleration sensor that detects a lateral acceleration of the vehicle. The acceleration sensor transmits, for example, acceleration information of the vehicle to the ECU 10. The yaw rate sensor is a detector that detects a yaw rate (a rotational angular velocity) around a vertical axis of the center of gravity of the vehicle. For example, a gyro sensor can be used as the yaw rate sensor. The yaw rate sensor transmits information on the detected yaw rate of the vehicle to the ECU 10.

The map database 4 is a database that stores map information. The map database 4 is formed, for example, in a hard disk drive (HDD) mounted in the vehicle. Map information includes position information of roads, shape information of roads (for example, curved parts, types of straight parts, and curvatures of the curved parts), position information of crossings and junctions, and position information of buildings. The map information includes traffic regulation information such as legal speed limits associated with the position information. The map information includes information on areas in which the automatic driving mode is executable. The map database 4 may be stored in a computer of a facility such as a management center that can communicate with the vehicle.

The driver operation detecting unit 5 is a device that detects an operation of the driver of the vehicle on the vehicle. The driver operation detecting unit 5 includes a steering sensor, an accelerator pedal sensor, and a brake pedal sensor. The steering sensor includes, for example, a steering torque sensor and a steering touch sensor. The steering torque sensor is disposed in a steering shaft of the vehicle and detects a steering torque which the driver applies to a steering wheel. The steering touch sensor is disposed in the steering wheel of the vehicle and detects the driver's touch of the steering wheel and a pressure with which the driver grasps the steering wheel. The accelerator pedal sensor is disposed in a shaft portion of an accelerator pedal and detects a depression force or a depression amount on the accelerator pedal (a position of the accelerator pedal) by the driver. The brake pedal sensor is disposed in a shaft portion of a brake pedal and detects a depression force or a depression amount on the brake pedal (a position of the brake pedal) by the driver. The driver operation detecting unit 5 transmits the detection result of the driver's operation on the vehicle to the ECU 10.

The driver operation detecting unit 5 detects an operation of starting the automatic driving mode. The driver operation detecting unit 5 includes an automatic driving mode start switch for starting the automatic driving mode. The driver operation detecting unit 5 detects that the operation of starting the automatic driving mode has been performed when the automatic driving mode start switch is switched from an OFF state to an ON state. The driver operation detecting unit 5 detects that canceling of the operation of starting the automatic driving mode has been performed when the automatic driving mode start switch is switched from the ON state to the OFF state. The operation of starting the automatic driving mode is not limited to the operation using the switch, but may be a voice input or another operation.

The driver monitor camera 6 is disposed at a position facing the driver above of a cover of a steering column of the vehicle and images the driver. A plurality of driver monitor cameras 6 may be disposed to image the driver from a plurality of directions. The driver monitor camera 6 transmits imaging information of the driver to the ECU 10.

The occupant detecting unit 7 is a detector that detects an occupant of the vehicle. The occupant detecting unit 7 includes a seat sensor and a seat belt sensor. The seat sensor is a sensor that detects sitting of an occupant. A pressure sensor provided for each seat of the vehicle can be used as the seat sensor. The seat belt sensor is a sensor that detects whether an occupant wears a seat belt. The seat belt sensor is provided for each seat belt of the vehicle. The occupant detecting unit 7 transmits detection results of the seat sensor and the seat belt sensor to the ECU 10.

The actuator 8 is a device that performs traveling control of the vehicle. The actuator 8 includes at least a throttle actuator, a brake actuator, and a steering actuator. The throttle actuator controls an amount of air supplied to an engine (a throttle opening level) in accordance with a control signal from the ECU 10 and controls a driving force of the vehicle. When the vehicle is a hybrid vehicle, a control signal from the ECU 10 is input to a motor as a power source in addition to the amount of air supplied to the engine to control a driving force thereof. When the vehicle is an electric vehicle, a control signal from the ECU 10 is input to a motor as a power source to control a driving force thereof. In this case, the motor is a power source that constitutes the actuator 8.

The brake actuator controls a brake system in accordance with a control signal from the ECU 10 and controls a braking force to be applied to the vehicle wheels of the vehicle. For example, a hydraulic brake system can be used as the brake system. The steering actuator controls driving of an assist motor that controls a steering torque in an electric power steering system in accordance with a control signal from the ECU 10. Accordingly, the steering actuator controls the steering torque of the vehicle.

The HMI 9 is an interface that is used to input and output information between the vehicle control system 100 and the driver. The HMI 9 includes, for example, a display and a speaker and functions as a notification device that notifies the driver of information. The HMI 9 may include a head up display (HUD) as a display. The HMI 9 performs an image output to the display and a voice output from the speaker in accordance with a control signal from the ECU 10. The HMI 9 may use a portable information terminal or a wearable device connected to the ECU 10 by radio communication as an input and output terminal. The HMI 9 may perform notification of a driver by vibration by driving a vibration actuator disposed in a seat or a wearable device.

A functional configuration of the ECU 10 will be described below. The ECU 10 includes a vehicle state recognizing unit 11, an occupant state recognizing unit 12, a traveling plan creating unit 13, a driver operation recognizing unit 14, a mode switching unit 15, a vehicle control unit 16, and a notification control unit 17. Some of the functions of the ECU 10 may be embodied by an external server that can communicate with the vehicle.

The vehicle state recognizing unit 11 recognizes a vehicle state of the vehicle. The vehicle state includes a position of the vehicle, a traveling environment of the vehicle, a traveling state of the vehicle, and a device state of the vehicle. The vehicle state recognizing unit 11 includes a vehicle position recognizing unit 21, a traveling environment recognizing unit 22, a traveling state recognizing unit 23, and a device state recognizing unit 24.

The vehicle position recognizing unit 21 recognizes the position of the vehicle on a map based on the position information of the GPS receiver 1 and the map information of the map database 4. The vehicle position recognizing unit 21 recognizes the position of the vehicle by a simultaneous localization and mapping (SLAM) technique using position information of fixed obstacles such as electric poles included in the map information of the map database 4 and the detection result of the external sensor 2. The vehicle position recognizing unit 21 may recognize the position of the vehicle on the map using other known techniques.

The traveling environment recognizing unit 22 recognizes the traveling environment around the vehicle based on the detection result of the external sensor 2. The traveling environment includes positions of obstacles relative to the vehicle, relative speeds of the obstacles relative to the vehicle, and moving directions of the obstacles relative to the vehicle. The traveling environment recognizing unit 22 recognizes the traveling environment of the vehicle using a known method based on captured images of the camera and obstacle information of the radar sensor.

The traveling state recognizing unit 23 recognizes the traveling state of the vehicle based on the detection result of the internal sensor 3. The traveling state includes a vehicle speed of the vehicle, an acceleration of the vehicle, and a yaw rate of the vehicle. Specifically, the traveling state recognizing unit 23 recognizes the vehicle speed of the vehicle based on the vehicle speed information of the vehicle speed sensor. The traveling state recognizing unit 23 recognizes the acceleration of the vehicle based on vehicle speed information of the acceleration sensor. The traveling state recognizing unit 23 recognizes a direction of the vehicle based on yaw rate information of the yaw rate sensor. The traveling state recognizing unit 23 may recognize open/closed states of doors of the vehicle, on/off states of direction indicators of the vehicle, and an operating state of a parking brake of the vehicle based on the detection results of various sensors mounted in advance in the vehicle.

The device state recognizing unit 24 recognizes the device state of various devices mounted in the vehicle. The device state recognizing unit 24 recognizes states of various sensors of the vehicle and the ECU 10 associated with execution of the automatic driving mode or the transition mode. The device state recognizing unit 24 recognizes whether various sensors and the ECU 10 are in a normal state using a known technique.

The device state recognizing unit 24 may calculate reliabilities of various sensors and the ECU 10 using a known technique and may recognize that various sensors and the ECU 10 are in an abnormal state when the reliabilities are equal to or less than a reliability threshold value. The reliability threshold value is a preset value. Threshold values which will be used in the following description are preset values unless particularly mentioned.

The occupant state recognizing unit 12 recognizes the occupant state of the vehicle. The occupant state includes a driver state and a seat belt wearing state. The occupant state recognizing unit 12 includes a driver state recognizing unit 25 and the seat belt wearing recognizing unit 26.

The driver state recognizing unit 25 recognizes the driver state based on the detection result of the driver operation detecting unit 5 and imaging information of the driver monitor camera 6. The driver state includes the driver's steering wheel holding state, the driver's alertness level, and the driver's degree of concentration on driving.

The driver state recognizing unit 25 recognizes the driver's steering wheel holding state based on the detection result of the driver operation detecting unit 5 (the detection result of the steering sensor). The driver state recognizing unit 25 recognizes whether the driver holds the steering wheel of the vehicle as the driver's steering wheel holding state.

The driver state recognizing unit 25 recognizes the driver's alertness level based on the detection result of the driver operation detecting unit 5 and the imaging information of the driver monitor camera 6. The driver's alertness level is a degree to which the driver is alert, rather than in a semiconscious state due to insufficient sleep or the like. The driver state recognizing unit 25 recognizes the driver's alertness level from an eye opening state or an eye blinking frequency of the driver based on the imaging information of the driver monitor camera 6. The driver state recognizing unit 25 may recognize the driver's alertness level using a pressure with which the driver grasps the steering wheel. The driver state recognizing unit 25 may acquire condition information (such as heartbeat information and brain wave information) of the driver by communicating with a wearable device worn on the driver's body or a portable information terminal. The driver state recognizing unit 25 may recognize the driver's alertness level using the acquired condition information of the driver. The driver state recognizing unit 25 may acquire heartbeat information of the driver via a detection electrode disposed in the steering wheel and recognize the driver's alertness level from the heartbeat information of the driver. The driver state recognizing unit 25 can recognize the driver's alertness level using a known technique based on a variety of information.

The driver state recognizing unit 25 recognizes the driver's degree of concentration on driving based on the detection result of the driver operation detecting unit 5 and the imaging information of the driver monitor camera 6. The driver's degree of concentration on driving is a degree to which the driver concentrates on driving the vehicle. The driver state recognizing unit 25 recognizes the driver's degree of concentration on driving from a face direction of the driver or a facing direction of the driver based on the imaging information of the driver monitor camera 6. The driver state recognizing unit 25 may recognize that the degree of concentration on driving is low when it is recognized that the driver faces a direction other than forward or a neighboring lane of the vehicle and looks away. The driver state recognizing unit 25 may recognize that the degree of concentration on driving is low when it is recognized that the driver looks at an audio device in the vehicle.

The driver state recognizing unit 25 may recognize the degree of concentration on driving from a steering frequency of the driver based on the detection result of the driver operation detecting unit 5. The driver state recognizing unit 25 may recognize the degree of concentration on driving based on the condition information of the driver acquired from a wearable device or the like. The driver state recognizing unit 25 can recognize the driver's degree of concentration on driving using a known technique based on a variety of information.

The seat belt wearing recognizing unit 26 recognizes whether an occupant of the vehicle wears a seat belt based on the detection result of the occupant detecting unit 7 (a seat belt sensor). The seat belt wearing recognizing unit 26 recognizes whether there is an occupant of each seat of the vehicle based on the detection result of the occupant detecting unit 7. The seat belt wearing recognizing unit 26 recognizes whether an occupant of the vehicle wears a seat belt based on the detection result of the seat belt sensor of the seat on which there is an occupant. Occupants includes the driver.

The occupant state recognizing unit 12 may recognize the number of occupants in the vehicle as the occupant state based on the detection result of the occupant detecting unit 7. The occupant state recognizing unit 12 may recognize an arrangement of the occupants in the seats as the occupant state based on the detection result of the occupant detecting unit 7.

The traveling plan creating unit 13 sets a target route of the vehicle based on a preset destination, the position of the vehicle on the map recognized by the vehicle position recognizing unit 21, and the map information of the map database 4. The destination may be a destination which is set by the driver or may be destination which is automatically set by the vehicle control system 100 using a known technique. The target route is a route on which the vehicle travels automatically when the driving mode of the vehicle is the automatic driving mode.

The target route described in this specification includes a traveling route which is automatically created based on external situations or map information when a destination is not explicitly set by the driver, like a traveling route along a road in a "driving support device" described in Japanese Patent No. 5382218 (WO2011/158347) or Japanese Patent Application Publication No. 2011-162132.

The traveling plan creating unit 13 creates a traveling plan of the vehicle based on the target route, the map information of the map database 4, the traveling environment of the vehicle recognized by the traveling environment recognizing unit 22, and the traveling state of the vehicle recognized by the traveling state recognizing unit 23. The traveling plan includes a control target value of the vehicle depending on the position of the vehicle on the target route. The position on the target route is a position in the direction in which the target route extends on the map. The position on the target route refers to a set longitudinal position set in advance at predetermined intervals (for example, 1 m) in the direction in which the target route extends. The control target value is a value which serves as a control target of the vehicle in the traveling plan. The control target value is set in correlation with the set longitudinal positions on the target route. The traveling plan creating unit 13 creates the traveling plan by setting the set longitudinal position at predetermined intervals on the target route and setting the control target value (for example, a target lateral position and a target vehicle speed) for each set longitudinal position. The set longitudinal position and the target lateral position may be set together as coordinates of a single position. The set longitudinal position and the target lateral position refer to information of a longitudinal position and information of a lateral position which are set as a target in the traveling plan.

The driver operation recognizing unit 14 recognizes the driver's operation on the vehicle based on the detection result of the driver operation detecting unit 5. The driver operation recognizing unit 14 recognizes the driver's driving operation including a steering wheel operation, an accelerator operation, and a brake operation. The driving operation may include an operation of a direction indicator and an operation of a parking brake. The driver operation recognizing unit 14 recognizes a detected automatic driving mode start operation and canceling of the automatic driving mode start operation which have been detected by the driver operation detecting unit 5.

The mode switching unit 15 switches the driving mode of the vehicle. First, a case in which the driving mode of the vehicle is the manual driving mode will be described. When the vehicle is in the manual driving mode and the automatic driving mode start operation is performed, the mode switching unit 15 determines whether an automatic driving mode execution condition is satisfied. The mode switching unit 15 determines whether the automatic driving mode execution condition is satisfied based on the vehicle state recognized by the vehicle state recognizing unit 11 and the occupant state recognized by the occupant state recognizing unit 12.

The automatic driving mode execution condition is a condition which is preset to execute the automatic driving mode. The automatic driving mode execution condition includes a first automatic driving mode execution condition which is satisfied by the vehicle state and a second automatic driving mode execution condition which is satisfied by the occupant state. Examples of the first automatic driving mode execution condition which is satisfied by the vehicle state include a condition that the vehicle be in an area (for example, an automobile road) in which the automatic driving mode is executable, a condition that the vehicle speed of the vehicle be lower than a speed threshold value (for example, a legal speed limit), a condition that a steering angle of the vehicle be less than a steering angle threshold value, a condition that a change in a vehicle motion (such as an acceleration/deceleration, a roll rate, a pitch rate, and a yaw rate) be less than a change threshold value, and a condition that a camera of the vehicle be in a normal state. The first automatic driving mode execution condition may include conditions that doors be closed, that a hood be closed, that a trunk be closed, that door mirrors be opened, that direction indicators be turned off (or that the on state of the direction indicators not be inconsistent with the situation of the vehicle), that a headlight be in an automatic ON mode, that a wiper be in an automatic operation mode, and that a hand brake not be pulled.

Examples of the second automatic driving mode execution condition which is satisfied by the occupant state include a condition that the driver hold a steering wheel, a condition that all occupants wear seat belts, a condition that the driver's degree of concentration on driving be equal to or greater than a driving concentration threshold value, and a condition that the driver's alertness level be equal to or greater than an alertness level threshold value. The second automatic driving mode execution condition may include a condition that the number of occupants be less than a fixed number.

When it is determined that the automatic driving mode execution condition is satisfied, the mode switching unit 15 switches the driving mode of the vehicle to the automatic driving mode.

When it is determined that the automatic driving mode execution condition is not satisfied, the mode switching unit 15 determines whether a transition mode execution condition is satisfied. The transition mode execution condition is a condition which is set in advance to execute the transition mode. The transition mode execution condition is set as a more lenient condition than the automatic driving mode execution condition. The mode switching unit 15 determines whether the transition mode execution condition is satisfied based on the vehicle state recognized by the vehicle state recognizing unit 11 and the occupant state recognized by the occupant state recognizing unit 12.

The transition mode execution condition includes a first transition mode execution condition which is satisfied by the vehicle state and a second transition mode execution condition which is satisfied by the occupant state. Examples of the transition mode execution condition which is satisfied by the vehicle state include a condition that a steering angle of the vehicle be less than a steering threshold value and a condition that a headlight and a camera of the vehicle be normal in a state in which the vehicle travels in a tunnel. The transition mode execution condition which is satisfied by the vehicle state may be satisfied when the speed of the vehicle is equal to or higher than a speed threshold value (for example, a legal speed limit), unlike the automatic driving mode execution condition. The steering angle threshold value of the transition mode execution condition may be set to a value greater than the steering angle threshold value of the automatic driving mode execution condition. When the transition mode execution condition is not satisfied, the automatic driving mode execution condition is not satisfied.

An example of the transition mode execution condition which is satisfied by the occupant state is a condition that occupants other than the driver wear seat belts. That is, the transition mode execution condition which is satisfied by the occupant state may be satisfied when a driver does not wear a seat belt for the purpose of checking the rear side, unlike the automatic driving mode execution condition.

When it is determined that the transition mode execution condition is satisfied during traveling in the manual driving mode, the mode switching unit 15 switches the driving mode of the vehicle to the transition mode. When it is determined that the transition mode execution condition is not satisfied, the mode switching unit 15 maintains the manual driving mode.

A case in which the driving mode of the vehicle is the transition mode will be described below. When the driving mode of the vehicle is the transition mode, the mode switching unit 15 determines whether the automatic driving mode execution condition is satisfied. When it is determined that the automatic driving mode execution condition is satisfied, the mode switching unit 15 switches the driving mode of the vehicle to the automatic driving mode. When it is determined that the automatic driving mode execution condition is not satisfied, the mode switching unit 15 determines whether the transition mode execution condition is satisfied.

When it is determined that the transition mode execution condition is satisfied, the mode switching unit 15 maintains the transition mode. When it is determined that the transition mode execution condition is not satisfied, the mode switching unit 15 switches the driving mode of the vehicle to the manual driving mode.

When the driving mode of the vehicle is switched from the transition mode to the manual driving mode, the mode switching unit 15 performs a preset manual driving preparation process. The manual driving preparation process includes various processes for causing the driver to prepare for manual driving. The manual driving preparation process includes a process of securing a margin time until the driver starts the manual driving due to extension of the transition mode or the like. Various known processes can be employed as the manual driving preparation process.

A case in which the driving mode of the vehicle is the automatic driving mode will be described below. When the driving mode of the vehicle is the automatic driving mode, the mode switching unit 15 determines whether the automatic driving mode execution condition is satisfied. When it is determined that the automatic driving mode execution condition is satisfied, the mode switching unit 15 maintains the automatic driving mode. When it is determined that the automatic driving mode execution condition is not satisfied, the mode switching unit 15 determines whether the transition mode execution condition is satisfied.

When it is determined that the transition mode execution condition is satisfied, the mode switching unit 15 switches the driving mode of the vehicle to the transition mode. When it is determined that the transition mode execution condition is not satisfied, the mode switching unit 15 switches the driving mode of the vehicle to the manual driving mode. The mode switching unit 15 performs the manual driving preparation process before switching the driving mode of the vehicle to the manual driving mode.

In addition, when the driving mode of the vehicle is the automatic driving mode or the transition mode and the driver operation recognizing unit 14 recognizes that the automatic driving mode start operation is cancelled, the mode switching unit 15 switches the driving mode of the vehicle to the manual driving mode. Cancelling of the automatic driving mode start operation (a manual driving mode start operation) may include a so-called override operation. That is, cancelling of the automatic driving mode start operation may include an operation of rotating the steering wheel to be equal to or greater than an angle threshold value and an operation of depressing an accelerator pedal or a brake pedal such that a depression amount is equal to or greater than a threshold value. In this case, the mode switching unit 15 may perform the manual driving preparation process before switching the driving mode of the vehicle to the manual driving mode.

The mode switching unit 15 may take over setting of the automatic driving mode start operation after the engine stops. That is, when the engine of the vehicle stops in a state in which the automatic driving mode start operation is not cancelled, the mode switching unit 15 takes over setting of performing the automatic driving mode start operation after the engine of the vehicle starts. In this case, when the automatic driving mode execution condition is satisfied, the notification control unit 17 notifies the driver that the driving mode of the vehicle is switched to the automatic driving mode. In addition, when the driver does not perform the automatic driving mode start operation, the mode switching unit 15 may switch the driving mode of the vehicle to the automatic driving mode under predetermined conditions.

The vehicle control unit 16 controls the vehicle in accordance with the driving mode of the vehicle. The vehicle control unit 16 controls the vehicle by transmitting a control signal to the actuator 8. When the driving mode of the vehicle is the automatic driving mode, the vehicle control unit 16 causes the vehicle to travel automatically based on the traveling plan created by the traveling plan creating unit 13. The vehicle control unit 16 performs automatic driving of the vehicle using a known technique.

When the driving mode of the vehicle is the transition mode, the vehicle control unit 16 causes the vehicle to travel using cooperation between the driver's driving operation and the traveling control. When the driver's driving operation is input, the vehicle control unit 16 does not reflect an operation amount of the driving operation in traveling of the vehicle without change, but adjusts the operation amount of the driving operation in accordance with the traveling plan and reflects the adjusted operation amount in traveling of the vehicle. When the driver's driving operation is not input, the vehicle control unit 16 causes the vehicle to travel in accordance with the traveling plan. The vehicle control unit 16 does not need to use the traveling plan in the transition mode. The vehicle control unit 16 may control traveling of the vehicle based on the detection result of the external sensor 2 and the detection result of the internal sensor 3. The vehicle control unit 16 can execute the transition mode using cooperation between the driver's driving operation and the traveling control using a known technique. In the transition mode, the driver is encouraged to check surroundings of the vehicle.

When the mode switching unit 15 switches the driving mode of the vehicle, the notification control unit 17 notifies the driver of switching of the driving mode via the HMI 9. The notification control unit 17 notifies the driver of a reason for switching of the driving mode via the HMI 9. The notification control unit 17 notifies the driver by transmitting a control signal to the HMI 9. The notification control unit 17 notifies the driver by an image output to the display and/or a voice output from the speaker. The notification control unit 17 may notify the driver also using vibration or the like.

<<Case in which Driving Mode of Vehicle is Manual Driving Mode>>

First, a case in which the driving mode of the vehicle is the manual driving mode will be described below. When the driving mode of the vehicle is switched from the manual driving mode to the automatic driving mode by the driver's automatic driving mode start operation, the notification control unit 17 notifies the driver of switching to the automatic driving mode.

When the driver has performed the automatic driving mode start operation but the automatic driving mode execution condition is not satisfied and the driving mode of the vehicle is switched to the transition mode, the notification control unit 17 notifies the driver of switching to the transition mode via the HMI 9. At this time, the notification control unit 17 notifies the driver of a reason for switching the driving mode of the vehicle from the manual driving mode to the transition mode via the HMI 9. The reason for switching to the transition mode corresponds to an unsatisfied condition among the automatic driving mode execution conditions. The notification control unit 17 may notify the driver of an unsatisfied condition among the automatic driving mode execution conditions as the reason for switching to the transition mode.

When the driving mode of the vehicle is switched to the transition mode, not to the automatic driving mode, due to the vehicle state, the notification control unit 17 notifies the driver of the reason for switching to the transition mode based on the vehicle state. A case in which the driving mode of the vehicle is switched to the transition mode due to the vehicle state refers to a case in which the first automatic driving mode execution condition which is satisfied by the vehicle state has not been satisfied and thus the driving mode of the vehicle is switched to the transition mode, not to the automatic driving mode.

Specifically, when the vehicle speed of the vehicle is equal to or higher than a speed threshold value (for example, a legal speed limit), the first automatic driving mode execution condition is not satisfied and thus the mode switching unit 15 switches the driving mode of the vehicle to the transition mode. In this case, the notification control unit 17 notifies the driver that the vehicle speed of the vehicle is equal to or higher than the speed threshold value and thus the first automatic driving mode execution condition has not been satisfied as the reason for switching to the transition mode. The notification control unit 17 may notify the driver of the automatic driving mode execution condition without distinguishing the first automatic driving mode execution condition and the second automatic driving mode execution condition from each other. The same is true of the transition mode execution condition.

When the driving mode of the vehicle is switched to the transition mode, not to the automatic driving mode, due to the occupant state, the notification control unit 17 notifies the driver of the reason for switching to the transition mode based on the occupant state. A case in which the driving mode of the vehicle is switched not to the automatic driving mode but to the transition mode due to the occupant state refers to a case in which the second automatic driving mode execution condition which is satisfied by the occupant state has not been satisfied and thus the driving mode of the vehicle is switched not to the automatic driving mode but to the transition mode.

Specifically, when there is an occupant not wearing a seat belt, the second automatic driving mode execution condition has not been satisfied and thus the mode switching unit 15 switches the driving mode of the vehicle to the transition mode. In this case, the notification control unit 17 notifies the driver that an occupant is not wearing a seat belt and thus the second automatic driving mode execution condition has not been satisfied as the reason for switching to the transition mode.

When the driver does not hold the steering wheel, the second automatic driving mode execution condition has not been satisfied and thus the mode switching unit 15 switches the driving mode of the vehicle to the transition mode. In this case, the notification control unit 17 notifies the driver that the driver does not hold the steering wheel and thus the second automatic driving mode execution condition has not been satisfied as the reason for switching to the transition mode. The notification control unit 17 may notify the occupant not wearing a seat belt.

When the automatic driving mode start operation has been performed but the automatic driving mode execution condition and the transition mode execution condition have not been satisfied and thus the manual driving mode is maintained, the notification control unit 17 notifies the driver of the reason for not switching to the automatic driving mode and the transition mode. The reason for not switching to the automatic driving mode and the transition mode corresponds to an unsatisfied condition among the transition mode execution conditions.

When a plurality of automatic driving mode execution conditions have not been satisfied and thus the driving mode of the vehicle is switched not to the automatic driving mode but to the transition mode, the notification control unit 17 may give a notification priority to the plurality of unsatisfied automatic driving mode execution conditions. The notification control unit 17 notifies the driver of the unsatisfied automatic driving mode execution conditions in the priority as the reason for switching to the transition mode.

The notification control unit 17 sets the priority of a condition associated with a law among the plurality of unsatisfied automatic driving mode execution conditions to be higher than the priority of a condition not associated with a law. Examples of conditions associated with laws include the condition that an occupant wear a seat belt and the condition of a legal speed limit. Specifically, when two conditions including the condition that an occupant wear a seat belt and the condition of a steering angle (that the steering angle of the vehicle be less than the steering angle threshold value) are not satisfied, the notification control unit 17 sets the priority of the condition that an occupant wear a seat belt to be higher than the priority of the condition of a steering angle. The condition associated with the law can be said to be a condition having high public necessity for the purpose of as safety of occupants, realization of appropriate traffic flow, and the like.

The notification control unit 17 sets the priority of a condition having an influence on the outside of the vehicle among the plurality of unsatisfied automatic driving mode execution conditions to be higher than the priority of a condition having no influence on the outside of the vehicle. Examples of the condition having an influence on the outside of the vehicle include a legal speed limit. Examples of the condition having no influence on the outside of the vehicle include the condition that an occupant wear a seat belt. The notification control unit 17 sets the priority of the condition of a legal speed limit to be higher than the priority of the condition that an occupant wear a seat belt. When the condition having an influence on the outside of the vehicle is not satisfied, there is concern that realization of appropriate traffic flow will be hindered.

The notification control unit 17 may give a notification priority to the automatic driving mode execution conditions based on a past history of the driver associated with the automatic driving mode. The notification control unit 17 stores an unsatisfied automatic driving mode execution condition when the driver has performed the automatic driving mode start operation in the past. When the number of times the driver has performed the automatic driving mode start operation without satisfying the same automatic driving mode execution condition is equal to or greater than a predetermined value, the notification control unit 17 sets the priority of the condition to be higher.

The notification control unit 17 may display all the unsatisfied automatic driving mode execution conditions as a list on the display regardless of the priority.

<<Case in which Driving Mode of Vehicle is Transition Mode>>

A case in which the driving mode of the vehicle is the transition mode will be described below. Here, a case in which the driver has performed the automatic driving mode start operation but the automatic driving mode execution conditions have not been satisfied and thus the driving mode of the vehicle has been switched to the transition mode will be described.

When the automatic driving mode start operation has not been cancelled, the notification control unit 17 notifies the driver of unsatisfied conditions (the reason for not switching to the automatic driving mode) among the automatic driving mode execution conditions via the HMI 9 while the driving mode of the vehicle is the transition mode. The notification control unit 17 displays the unsatisfied conditions among the automatic driving mode execution conditions as a list on the display while the driving mode of the vehicle is the transition mode.

When the driving mode of the vehicle is the transition mode, the notification control unit 17 may notify the driver of conditions which will not be satisfied among the transition mode execution conditions. For example, when the driver greatly turns the steering wheel (when the steering wheel is turned to be greater than a predetermined value), the notification control unit 17 notifies the driver that when the steering angle of the vehicle is equal to or greater than the steering angle threshold value, the transition mode execution conditions are not satisfied and the driving mode of the vehicle is switched to the manual driving mode.

When the driving mode of the vehicle is the transition mode and the automatic driving mode execution conditions are satisfied and thus the driving mode of the vehicle is switched to the automatic driving mode, the notification control unit 17 notifies the driver of switching to the automatic driving mode via the HMI 9. At this time, the notification control unit 17 notifies the driver of the reason for switching from the transition mode to the automatic driving mode via the HMI 9. The reason for switching to the automatic driving mode corresponds to a finally satisfied condition among the automatic driving mode execution conditions. The notification control unit 17 may notify the driver of a currently satisfied condition among the automatic driving mode execution conditions as the reason for switching to the automatic driving mode.

When the driving mode of the vehicle is switched from the transition mode to the automatic driving mode due to the vehicle state, the notification control unit 17 notifies the driver of the reason for switching to the automatic driving mode based on the vehicle state. The case in which the driving mode of the vehicle is switched from the transition mode to the automatic driving mode due to the vehicle state refers to a case in which the first automatic driving mode execution condition has been satisfied due to a change of the vehicle state and thus the driving mode of the vehicle is switched to the automatic driving mode in a state in which only the first automatic driving mode execution condition which is satisfied by the vehicle state is not satisfied and thus the driving mode has been switched to the transition mode.

Specifically, when the first automatic driving mode execution condition has been satisfied due to change of the vehicle speed of the vehicle from a speed equal to or higher than a speed threshold value to a speed lower than the speed threshold value, the mode switching unit 15 switches the driving mode of the vehicle from the transition mode to the automatic driving mode. In this case, the notification control unit 17 notifies the driver that the vehicle speed of the vehicle has become lower than the speed threshold value and thus the first automatic driving mode execution condition has been satisfied as the reason for switching to the automatic driving mode.

Similarly, when the driving mode of the vehicle is switched from the transition mode to the automatic driving mode due to the occupant state, the notification control unit 17 notifies the driver of the reason for switching to the automatic driving mode based on the occupant state. The case in which the driving mode of the vehicle is switched from the transition mode to the automatic driving mode due to the occupant state refers to a case in which the second automatic driving mode execution condition has been satisfied due to change of the occupant state and thus the driving mode of the vehicle is switched to the automatic driving mode in a state in which the second automatic driving mode execution condition which is satisfied by the occupant state has not been satisfied and thus the driving mode of the vehicle has switched to the automatic driving mode.

Specifically, when the second automatic driving mode execution condition has been satisfied by switching an occupant from a state in which the occupant does not wear a seat belt to a state in which all the occupant wear a seat belt, the mode switching unit 15 switches the driving mode of the vehicle from the transition mode to the automatic driving mode. In this case, the notification control unit 17 notifies the driver that all the occupants are wearing seat belts and thus the second automatic driving mode execution condition has been satisfied as the reason for switching to the automatic driving mode.

Subsequently, when the driving mode of the vehicle is the transition mode and the transition mode execution conditions are not satisfied and thus the driving mode of the vehicle is switched to the manual driving mode, the notification control unit 17 notifies the driver of switching to the manual driving mode. At this time, the notification control unit 17 notifies the driver of the reason for switching from the transition mode to the manual driving mode. The reason for switching to the manual driving mode corresponds to an unsatisfied condition among the transition mode execution conditions. The notification control unit 17 may notify the driver of the unsatisfied condition among the transition mode execution conditions as the reason for switching to the manual driving mode.

When the driving mode of the vehicle is switched from the transition mode to the manual driving mode due to the vehicle state, the notification control unit 17 notifies the driver of the reason for switching to the manual driving mode based on the vehicle state. The case in which the driving mode of the vehicle is switched from the transition mode to the manual driving mode due to the vehicle state refers to a case in which the first transition mode execution condition which is satisfied by the vehicle state has not been satisfied.

When a head lamp is not turned on due to an abnormality and forward imaging from the vehicle using the camera cannot be appropriately performed due to a situation in which the GPS receiver 1 cannot receive signals from GPS satellites due to entrance of the vehicle into a tunnel, the first transition mode execution condition is not satisfied and thus the mode switching unit 15 switches the driving mode of the vehicle from the transition mode to the manual driving mode. In this case, the notification control unit 17 notifies the driver that the vehicle travels in the tunnel and the head lamp has an abnormality and thus the first transition mode execution condition has not been satisfied as the reason for switching to the manual driving mode. When the radar sensor of the vehicle is in a normal state and the transition mode can be executed using only the radar sensor, the mode switching unit 15 does not need to switch the driving mode of the vehicle to the manual driving mode.

Similarly, when the driving mode of the vehicle is switched from the transition mode to the manual driving mode due to the occupant state, the notification control unit 17 notifies the driver of the reason for switching to the manual driving mode based on the occupant state. The case in which the driving mode of the vehicle is switched from the transition mode to the manual driving mode due to the occupant state refers to a case in which the second transition mode execution condition which is satisfied by the occupant state has not been satisfied.

Specifically, when an occupant other than the driver has taken off a seat belt and thus the second transition mode execution condition has not been satisfied, the mode switching unit 15 switches the driving mode of the vehicle from the transition mode to the manual driving mode. In this case, the notification control unit 17 notifies the driver that the occupant has taken off a seat belt and thus the second transition mode execution condition has not been satisfied as the reason for switching to the manual driving mode. The notification control unit 17 may notify the occupant having taken off a seat belt.

When the automatic driving mode execution condition has not been satisfied and the transition mode execution condition has been satisfied and thus the driving mode of the vehicle is maintained in the transition mode, the notification control unit 17 notifies the driver of the reason for not being maintained in the automatic driving mode. The notification control unit 17 displays, for example, the reason for not being maintained in the automatic driving mode on the display. The reason for not being maintained in the automatic driving mode corresponds to an unsatisfied condition among the automatic driving mode execution conditions.

<<Case in which Driving Mode of Vehicle is Automatic Driving Mode>>

A case in which the driving mode of the vehicle is the automatic driving mode will be described below. When the driving mode of the vehicle is the automatic driving mode, the notification control unit 17 notifies the driver of conditions which will not be satisfied among the automatic driving mode execution conditions. For example, when a distance from the vehicle to an exit of an area in which the automatic driving mode is executable is equal to or less than a predetermined distance, the notification control unit 17 notifies the driver that the automatic driving mode execution conditions will not be satisfied when the vehicle passes through the exit.

When the driving mode of the vehicle is the automatic driving mode, the automatic driving mode execution conditions are not satisfied, and the driving mode of the vehicle is switched to the transition mode, the notification control unit 17 notifies the driver of switching to the transition mode. At this time, the notification control unit 17 notifies the driver of the reason for switching from the automatic driving mode to the transition mode via the HMI 9. The reason for switching to the transition mode corresponds to an unsatisfied condition among the automatic driving mode execution conditions.

When the driving mode of the vehicle is switched from the automatic driving mode to the transition mode due to the vehicle state, the notification control unit 17 notifies the driver of the reason for switching to the transition mode based on the vehicle state. The case in which the driving mode of the vehicle is switched from the automatic driving mode to the transition mode due to the vehicle state refers to a case in which the vehicle state changes and thus the first automatic driving mode execution condition is not satisfied.

Specifically, when the camera of the vehicle is recognized to be abnormal, the first automatic driving mode execution condition is not satisfied and thus the mode switching unit 15 switches the driving mode of the vehicle from the automatic driving mode to the transition mode. In this case, the notification control unit 17 notifies the driver that the camera of the vehicle is abnormal and thus the automatic driving mode execution conditions are not satisfied as the reason for switching to the transition mode. In this case, by causing the notification control unit 17 to notify the driver that the first automatic driving mode execution condition is not satisfied due to abnormality of the camera, it is possible to prevent the driver from undergoing useless trial and error by doubting another condition of the automatic driving mode execution conditions. When the camera of the vehicle is abnormal and the transition mode execution condition is not satisfied, the mode switching unit 15 finally switches the driving mode of the vehicle to the manual driving mode. The camera is recognized to be abnormal, for example, when halation of an image occurs due to the sunset or when an image cannot be captured due to excessive darkness.

Similarly, when the driving mode of the vehicle is switched from the automatic driving mode to the transition mode due to the occupant state, the notification control unit 17 notifies the driver of the reason for switching to the transition mode based on the occupant state. The case in which the driving mode of the vehicle is switched from the automatic driving mode to the transition mode due to the occupant state refers to a case in which the occupant state changes and thus the second automatic driving mode execution condition is not satisfied.

Specifically, when the second automatic driving mode execution condition is not satisfied by allowing the driver to release a seat belt for the purpose of visually checking the rear side of the vehicle at the time of moving backward in the automatic driving mode, the mode switching unit 15 switches the driving mode of the vehicle from the automatic driving mode to the transition mode. It is assumed that the occupants other than the driver do not release seat belts. In this case, the notification control unit 17 notifies the driver that the driver releases the seat belt and thus the second automatic driving mode execution condition is not satisfied as the reason for switching to the transition mode.

The vehicle control unit 16 may continue to cause the vehicle to automatically move backward (for example, move backward for parking) in the transition mode. In this case, the vehicle control unit 16 can improve convenience for the driver in comparison with a case in which the driving mode of the vehicle is switched to the transition mode to stop the traveling control of the vehicle (for example, automatic parking control).

Here, when the second automatic driving mode execution condition is not satisfied due to the occupant state, the mode switching unit 15 may provide a predetermined extension time before switching the driving mode of the vehicle from the automatic driving mode to the transition mode. When the second automatic driving mode execution condition is not satisfied, the notification control unit 17 notifies the driver of switching to the transition mode and the reason for switching. When the second automatic driving mode execution condition is satisfied again before the extension time elapses, the mode switching unit 15 maintains the automatic driving mode.

When the driving mode of the vehicle is the automatic driving mode, the automatic driving mode execution conditions and the transition mode execution conditions are not satisfied, and the driving mode of the vehicle is switched to the manual driving mode, the notification control unit 17 notifies the driver of switching to the manual driving mode. At this time, the notification control unit 17 notifies the driver of the reason for switching from the automatic driving mode to the manual driving mode. The reason for switching to the manual driving mode corresponds to an unsatisfied condition among the transition mode execution conditions.

When the driving mode of the vehicle is switched from the automatic driving mode to the manual driving mode due to the vehicle state, the notification control unit 17 notifies the driver of the reason for switching to the manual driving mode based on the vehicle state. The case in which the driving mode of the vehicle is switched from the automatic driving mode to the manual driving mode due to the vehicle state refers to a case in which the vehicle state changes and thus the first automatic driving mode execution condition and the first transition mode execution condition are not satisfied. Specific examples thereof are the same as in the case in which the driving mode of the vehicle is switched from the transition mode to the manual driving mode and thus description thereof will not be repeated.

Similarly, when the driving mode of the vehicle is switched from the automatic driving mode to the manual driving mode due to the occupant state, the notification control unit 17 notifies the driver of the reason for switching to the manual driving mode based on the occupant state. The case in which the driving mode of the vehicle is switched from the automatic driving mode to the manual driving mode due to the occupant state refers to a case in which the occupant state changes and thus the second automatic driving mode execution condition and the second transition mode execution condition are not satisfied.

The notification control unit 17 may notify the driver of the reason for switching before the driving mode of the vehicle is switched, or may notify the driver of the reason for switching after the driving mode of the vehicle is switched.

<Mode Switching Process of Vehicle Control System>

A mode switching process of the vehicle control system 100 according to the first embodiment will be described below with reference to the drawings.

<<Mode Switching Process from Manual Driving Mode>>

Figure 2:
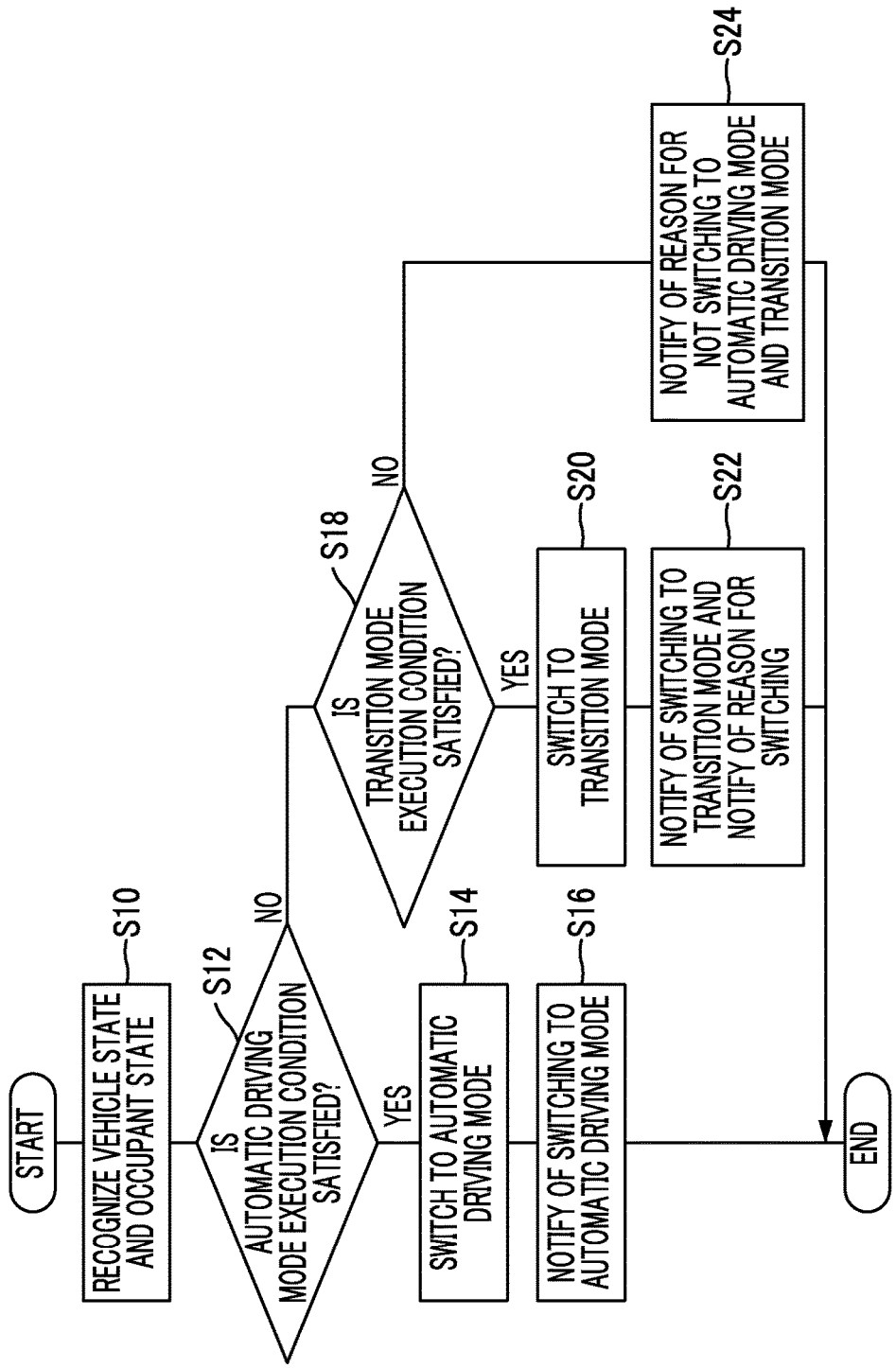
FIG. 2 is a flowchart illustrating a mode switching process from a manual driving mode.

FIG. 2 is a flowchart illustrating a mode switching process from the manual driving mode. The flowchart illustrated in FIG. 2 is performed when the vehicle is in the manual driving mode and the automatic driving mode start operation is performed.

As illustrated in FIG. 2, in S10, the ECU 10 of the vehicle control system 100 recognizes a vehicle state using the vehicle state recognizing unit 11 and recognizes an occupant state using the occupant state recognizing unit 12. The vehicle state recognizing unit 11 recognizes vehicle states such as the position of the vehicle, the traveling environment of the vehicle, the traveling state of the vehicle, and the device state of the vehicle. The occupant state recognizing unit 12 recognizes occupant states such as the driver state and the seat belt wearing state.

In S112, the ECU 10 determines whether the automatic driving mode execution conditions are satisfied using the mode switching unit 15. The mode switching unit 15 determines whether the automatic driving mode execution conditions are satisfied based on the vehicle state and the occupant state. When it is determined that the automatic driving mode execution conditions are satisfied (YES in S12), the ECU 10 performs S14. When it is determined that the automatic driving mode execution conditions are not satisfied (NO in S12), the ECU 10 performs S18.

In S14, the ECU 10 switches the driving mode of the vehicle from the manual driving mode to the automatic driving mode using the mode switching unit 15.

In S16, the ECU 10 notifies the driver of switching to the automatic driving mode using the notification control unit 17. The notification control unit 17 notifies the driver that the driving mode of the vehicle is switched to the automatic driving mode by transmitting a control signal to the HMI 9. Thereafter, the ECU 10 ends the current process.

In S18, the ECU 10 determines whether the transition mode execution conditions are satisfied using the mode switching unit 15. The mode switching unit 15 determines whether the transition mode execution conditions are satisfied based on the vehicle state and the occupant state. When it is determined that the transition mode execution conditions are satisfied (YES in S18), the ECU 10 performs S20. When it is determined that the transition mode execution conditions are not satisfied (NO in S18), the ECU 10 performs S24.

In S20, the ECU 10 switches the driving mode of the vehicle from the manual driving mode to the transition mode using the mode switching unit 15.

In S22, the ECU 10 performs notification of switching to the transition mode and notification of the reason for switching using the notification control unit 17. The notification control unit 17 notifies the driver of the reason for switching to the transition mode depending on an unsatisfied condition among the automatic driving mode execution conditions.

When the driving mode of the vehicle is switched to the transition mode due to the vehicle state, the notification control unit 17 notifies the driver of the reason for switching to the transition mode based on the vehicle state. When the driving mode of the vehicle is switched to the transition mode due to the occupant state, the notification control unit 17 notifies the driver of the reason for switching to the transition mode based on the occupant state. Thereafter, the ECU 10 ends the current process.

In S24, the ECU 10 performs notification of the reason for not being maintained in the automatic driving mode and the transition mode using the notification control unit 17. The notification control unit 17 notifies the driver of the reason for not being maintained in the automatic driving mode and the transition mode depending on unsatisfied conditions among the transition mode execution conditions. Thereafter, the ECU 10 ends the current process. When the automatic driving mode start operation is not cancelled (for example, when the manual driving mode start operation is not performed), the ECU 10 repeatedly performs S10 again after a predetermined time elapses.

When the reason for not being maintained in the automatic driving mode and the transition mode is not changed from the previous process, the ECU 10 does not need to repeatedly notify the driver of the reason for not being maintained in the automatic driving mode and the transition mode in S24. When the driving mode of the vehicle is switched to the automatic driving mode after switching to the automatic driving mode fails once, the ECU 10 may notify the driver of the reason for switching to the automatic driving mode (currently satisfied conditions among the automatic driving mode execution conditions) in S16.

<<Mode Switching Process from Transition Mode>>

Figure 3:
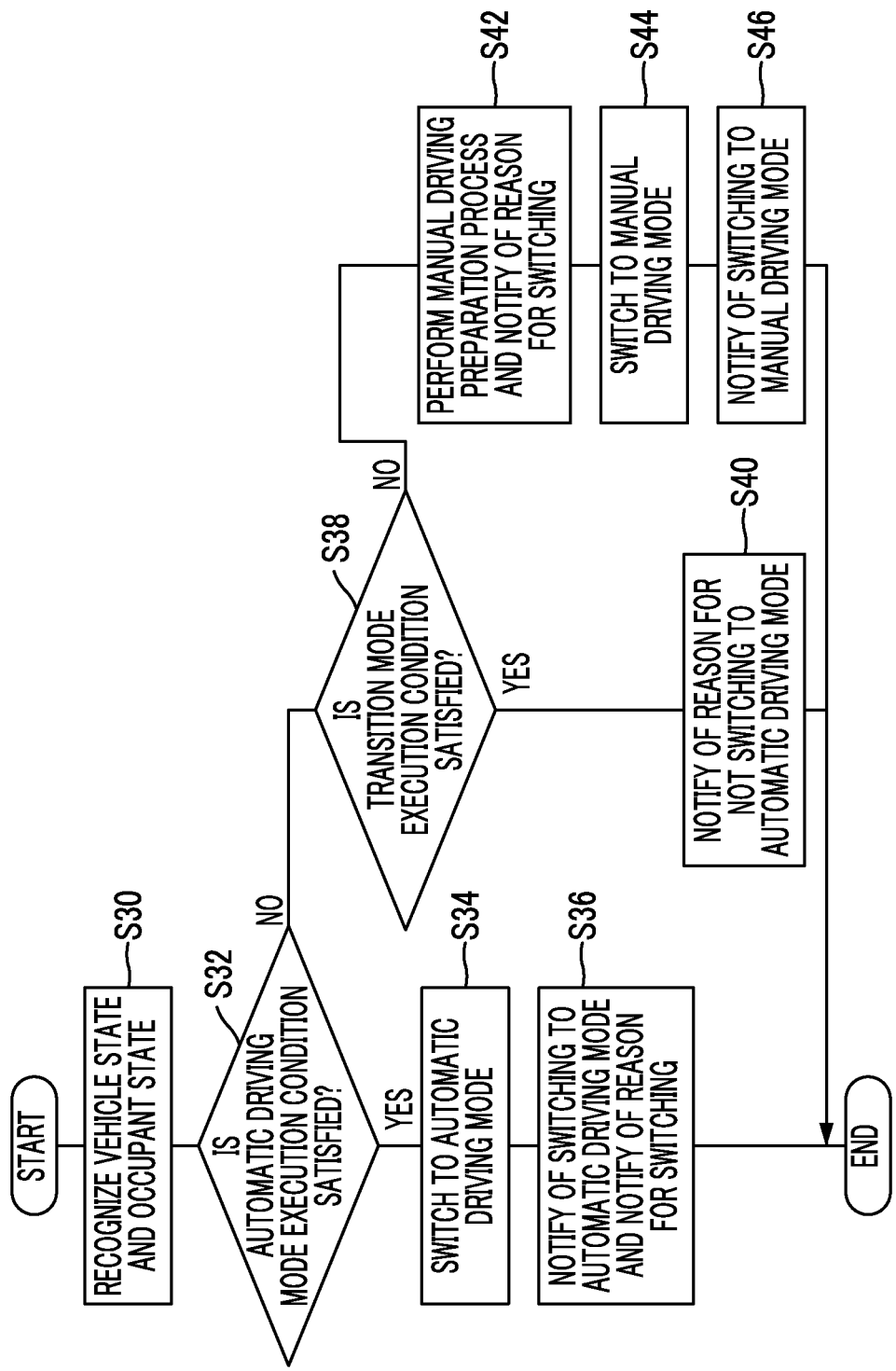
FIG. 3 is a flowchart illustrating a mode switching process from a transition mode.

A mode switching process from the transition mode will be described below with reference to FIG. 3. FIG. 3 is a flowchart illustrating the mode switching process from the transition mode. The flowchart illustrated in FIG. 3 is performed when the vehicle is in the transition mode and the automatic driving mode start operation is not cancelled. S30, S32, S34, and S38 in FIG. 3 are the same as S10, S12, S14, and S18 illustrated in FIG. 2 and description thereof will be made in brief.

As illustrated in FIG. 3, in S30, the ECU 10 recognizes the vehicle state using the vehicle state recognizing unit 11 and recognizes the occupant state using the occupant state recognizing unit 12.

In S32, the ECU 10 determines whether the automatic driving mode execution conditions are satisfied using the mode switching unit 15. When it is determined that the automatic driving mode execution conditions are satisfied (YES in S32), the ECU 10 performs S34. When it is determined that the automatic driving mode execution conditions are not satisfied (NO in S32), the ECU 10 performs S38.

In S34, the ECU 10 switches the driving mode of the vehicle from the transition mode to the automatic driving mode using the mode switching unit 15.

In S36, the ECU 10 performs notification of switching to the automatic driving mode and notification of the reason for switching using the notification control unit 17. The notification control unit 17 notifies the driver of the reason for switching to the automatic driving mode depending on currently satisfied conditions among the automatic driving mode execution conditions. When the driving mode of the vehicle is switched to the automatic driving mode due to the vehicle state, the notification control unit 17 notifies the driver of the reason for switching to the automatic driving mode based on the vehicle state. When the driving mode of the vehicle is switched to the automatic driving mode due to the occupant state, the notification control unit 17 notifies the driver of the reason for switching to the automatic driving mode based on the occupant state. Thereafter, the ECU 10 ends the current process.

In S38, the ECU 10 determines whether the transition mode execution conditions are satisfied using the mode switching unit 15. When it is determined that the transition mode execution conditions are satisfied (YES in S38), the ECU 10 performs S40. When it is determined that the transition mode execution conditions are not satisfied (NO in S38), the ECU 10 performs S42.

In S40, the ECU 10 notifies the driver of the reason for not being maintained in the automatic driving mode using the notification control unit 17. The notification control unit 17 notifies the driver of the reason for not being maintained in the automatic driving mode depending on the unsatisfied conditions among the automatic driving mode execution conditions. Thereafter, the ECU 10 ends the current process. When the automatic driving mode start operation is not cancelled, the ECU 10 repeatedly performs S30 again after a predetermined time elapses. When the reason for not being maintained in the automatic driving mode is not changed from the previous process, the ECU 10 does not repeatedly notify the driver of the reason for not being maintained in the automatic driving mode in S40.

In S42, the ECU 10 performs a manual driving preparation process using the mode switching unit 15 and performs notification of the reason for switching from the transition mode to the manual driving mode using the mode switching unit 15. The mode switching unit 15 performs a known manual driving preparation process. The notification control unit 17 notifies the driver of the reason for switching to the manual driving mode depending on the unsatisfied conditions among the transition mode execution conditions.

When the driving mode of the vehicle is switched to the manual driving mode due to the vehicle state, the notification control unit 17 notifies the driver of the reason for switching to the manual driving mode based on the vehicle state. When the driving mode of the vehicle is switched to the manual driving mode due to the occupant state, the notification control unit 17 notifies the driver of the reason for switching to the manual driving mode based on the occupant state.

In S44, the ECU 10 switches the driving mode of the vehicle to the manual driving mode using the mode switching unit 15.

In S46, the ECU 10 notifies the driver of switching to the manual driving mode using the notification control unit 17. Thereafter, the ECU 10 ends the current process. When the automatic driving mode start operation is not cancelled, the ECU 10 performs the mode switching process from the manual driving mode which is illustrated in FIG. 2.

<<Mode Switching Process from Automatic Driving Mode>>

Figure 4:
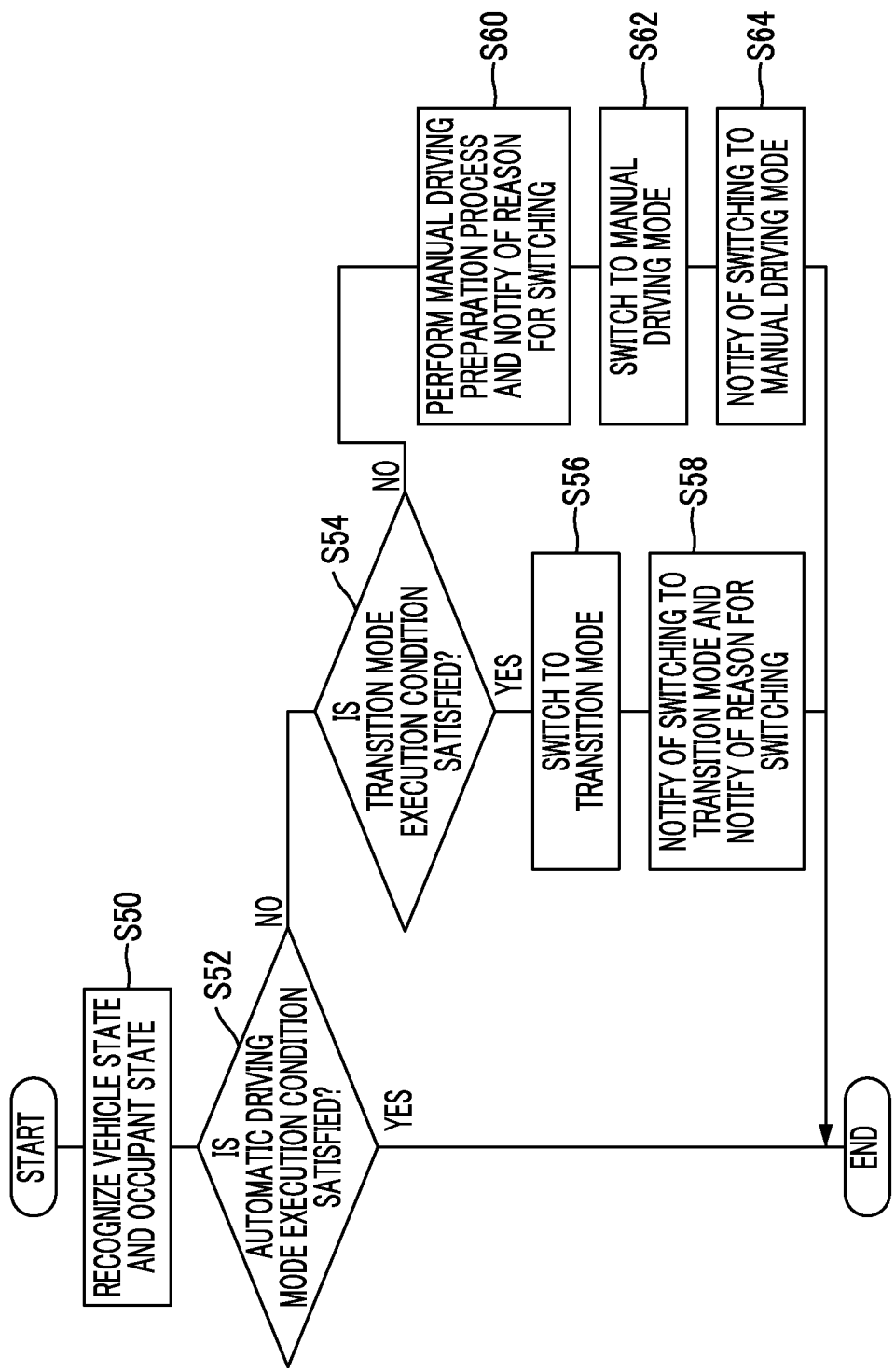
FIG. 4 is a flowchart illustrating a mode switching process from an automatic driving mode.

A mode switching process from the automatic driving mode will be described below with reference to FIG. 4. FIG. 4 is a flowchart illustrating the mode switching process from the automatic driving mode. The flowchart illustrated in FIG. 4 is performed when the vehicle is in the automatic driving mode.

S50, S52, S54, S56, and S58 in FIG. 4 are the same as S10, S12, S18, S20, and S22 illustrated in FIG. 2 and description thereof will be made in brief. Similarly, S60, S62, and S64 in FIG. 4 are the same as S42, S44, and S46 illustrated in FIG. 3 and description thereof will be made in brief.

As illustrated in FIG. 4, in S50, the ECU 10 recognizes the vehicle state using the vehicle state recognizing unit 11 and recognizes the occupant state using the occupant state recognizing unit 12.

In S52, the ECU 10 determines whether the automatic driving mode execution conditions are satisfied using the mode switching unit 15. When it is determined that the automatic driving mode execution conditions are satisfied (YES in S52), the ECU 10 ends the current process. Thereafter, the ECU 10 repeatedly performs S50 again after a predetermined time elapses. When it is determined that the automatic driving mode execution conditions are not satisfied (NO in S52), the ECU 10 performs S54.

In S54, the ECU 10 determines whether the transition mode execution conditions are satisfied using the mode switching unit 15. When it is determined that the transition mode execution conditions are satisfied (YES in S54), the ECU 10 performs S56. When it is determined that the transition mode execution conditions are not satisfied (NO in S54), the ECU 10 performs S60.

In S56, the ECU 10 switches the driving mode of the vehicle from the automatic driving mode to the transition mode using the mode switching unit 15.

In S58, the ECU 10 performs notification of switching to the transition mode and notification of the reason for switching using the notification control unit 17. The notification control unit 17 notifies the driver of the reason for switching to the transition mode depending on the unsatisfied conditions among the automatic driving mode execution conditions. When the driving mode of the vehicle is switched to the transition mode due to the vehicle state, the notification control unit 17 notifies the driver of the reason for switching to the transition mode based on the vehicle state. When the driving mode of the vehicle is switched to the transition mode due to the occupant state, the notification control unit 17 notifies the driver of the reason for switching to the transition mode based on the occupant state. Thereafter, the ECU 10 ends the current process. When the automatic driving mode start operation is not cancelled, the ECU 10 performs the mode switching process from the transition mode illustrated in FIG. 3.

In S60, the ECU 10 performs the manual driving preparation process using the mode switching unit 15 and performs notification of the reason for switching from the automatic driving mode to the manual driving mode using the notification control unit 17.

In S62, the ECU 10 switches the driving mode of the vehicle to the manual driving mode using the mode switching unit 15.

In S64, the ECU 10 notifies the driver of switching to the manual driving mode using the notification control unit 17. Thereafter, the ECU 10 ends the current process. When the automatic driving mode start operation is not cancelled, the ECU 10 performs the mode switching process from the manual driving mode which is illustrated in FIG. 2.

<<Operational Advantages of Vehicle Control System According to First Embodiment>>

According to the vehicle control system 100 according to the first embodiment, when the driving mode of the vehicle is switched from the automatic driving mode or the manual driving mode to the transition mode due to the vehicle state, it is possible to notify a driver of the reason for switching to the transition mode based on the vehicle state of the vehicle. Accordingly, in the vehicle control system 100, since a driver can understand the reason for switching to the transition mode due to the vehicle state, the driver can appropriately select a next action in consideration of the reason for switching to the transition mode. As a result, since the driver can understand the reason why the driving mode of the vehicle is switched not to the automatic driving mode but to the transition mode in spite of the automatic driving mode start operation, it is possible to avoid a situation in which the driver hinders a traffic flow due to trial and error for satisfying existing satisfied conditions among the automatic driving mode execution conditions.

Similarly, according to the vehicle control system 100, when the driving mode of the vehicle is switched from the automatic driving mode or the manual driving mode to the transition mode due to the occupant state of the vehicle, it is possible to notify a driver of the reason for switching to the transition mode based on the occupant state. Accordingly, in the vehicle control system 100, since a driver can understand the reason for switching to the transition mode due to the occupant state, the driver can appropriately select a next action in consideration of the reason for switching to the transition mode. Accordingly, by notifying a driver of the reason to the transition mode based on the occupant state, it is possible to promote the driver to get ready.

According to the vehicle control system 100, when the driving mode of the vehicle is switched from the transition mode to the automatic driving mode due to the vehicle state, a driver can be notified of the reason for switching and thus the driver can understand the reason for switching to the automatic driving mode. According to the vehicle control system 100, when the driving mode of the vehicle is switched from the transition mode to the manual driving mode due to the vehicle state, a driver can be notified of the reason for switching and thus the driver can understand the reason for switching to the manual driving mode.

Similarly, according to the vehicle control system 100, when the driving mode of the vehicle is switched from the transition mode to the automatic driving mode due to the occupant state, a driver can be notified of the reason for switching via the HMI 9 and thus the driver can understand the reason for switching to the automatic driving mode. According to the vehicle control system 100, when the driving mode of the vehicle is switched from the transition mode to the manual driving mode due to the occupant state, a driver can be notified of the reason for switching via the HMI 9 and thus the driver can understand the reason for switching to the manual driving mode. Accordingly, according to the vehicle control system 100, it is possible to deepen a driver's understanding of switching of the driving mode of the vehicle.

Second Embodiment

Figure 5:
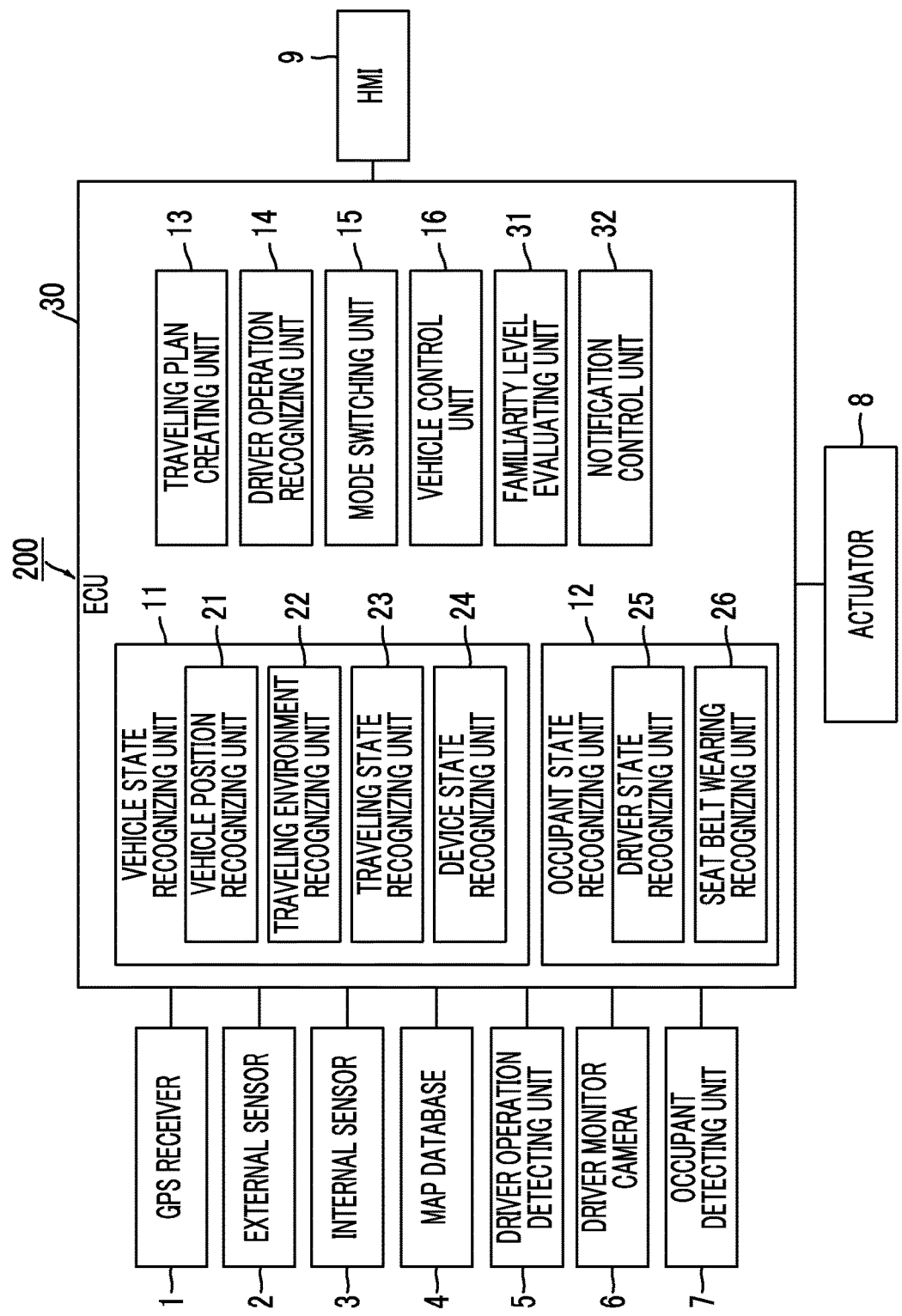
FIG. 5 is a block diagram illustrating a vehicle control system according to a second embodiment.

FIG. 5 is a block diagram illustrating a vehicle control system 200 according to a second embodiment. The vehicle control system 200 according to the second embodiment illustrated in FIG. 5 is different from the vehicle control system 100 according to the first embodiment, in that a notification style for a driver is changed based on a driver's automatic driving mode familiarity level. The automatic driving mode familiarity level is a degree of familiarity of the driver with the automatic driving mode.

<Configuration of Vehicle Control System According to Second Embodiment>

Specifically, an ECU 30 of the vehicle control system 200 according to the second embodiment is different from the ECU 10 according to the first embodiment, in that a familiarity level evaluating unit 31 is provided. Both ECUs are different from each other in the function of a notification control unit 32.

The familiarity level evaluating unit 31 evaluates a driver's automatic driving mode familiarity level. The familiarity level evaluating unit 31 performs personal authentication of the driver via the HMI 9 using a known technique. The familiarity level evaluating unit 31 recognizes the number of times in which the automatic driving mode start operation has been performed by the driver. The familiarity level evaluating unit 31 evaluates the driver's automatic driving mode familiarity level based on the number of times in which the automatic driving mode start operation has been performed by the driver. The number of times in which the automatic driving mode start operation has been performed is stored in the ECU 30. The number of times in which the automatic driving mode start operation has been performed is also counted even when the driving mode of the vehicle is not actually switched to the automatic driving mode. The number of times in which the automatic driving mode start operation has been performed refers to the number of times in which the driver has challenged the automatic driving mode. When the number of times in which the automatic driving mode start operation has been executed by the driver is equal to or greater than the number threshold value, the familiarity level evaluating unit 31 increases the automatic driving mode familiarity level.

The familiarity level evaluating unit 31 recognizes an automatic driving mode duration by a driver and evaluates the driver's automatic driving mode familiarity level based on the automatic driving mode duration by the driver. The automatic driving mode duration is an accumulated time period during which the driving mode of the vehicle is the automatic driving mode. The automatic driving mode duration is stored in the ECU 30. When the automatic driving mode duration by the driver is equal to or greater than a time threshold value, the familiarity level evaluating unit 31 increases the automatic driving mode familiarity level.

When the driver does not execute the automatic driving mode in a predetermined period (for example, one month) or more, the familiarity level evaluating unit 31 decreases the automatic driving mode familiarity level. The familiarity level evaluating unit 31 may evaluate a driver's automatic driving mode familiarity level using various other methods.

The notification control unit 32 changes a notification style for the driver based on the driver's automatic driving mode familiarity level which has been evaluated by the familiarity level evaluating unit 31. The notification style is a type of notification associated with switching of the driving mode of the vehicle. When the driver's automatic driving mode familiarity level is equal to or greater than a familiarity level threshold value, the notification control unit 32 sets the notification style to simple notification. When the driver's automatic driving mode familiarity level is less than the familiarity level threshold value, the notification control unit 32 sets the notification style to detailed notification.

The simple notification is a notification style in which at least one of an amount of information and a stimulus to a driver is smaller than that of the detailed notification. The detailed notification is a notification style in which at least one of an amount of information and a stimulus to a driver is larger than that of the simple notification. In the simple notification, notification with a smaller number of words than the detailed notification is performed. In the simple notification, the number of characters which are displayed on the display is set to be smaller than that in the detailed notification. In the simple notification, the number of words which are output by a voice output is set to be smaller than that of the detailed notification.

In the simple notification, luminance of an image display may be set to be less than that of the detailed notification. In the simple notification, a sound volume of the voice output may be set to be smaller than that of the detailed notification. In the simple notification, notification with a smaller number of types of notification (notification by image display, notification by voice output, notification by vibration, and the like) than that of the detailed notification may be performed. That is, when notification by image display, voice output, and vibration is performed in the detailed notification, notification by any one of image display and voice output may be performed in the simple notification. Specifically, in the simple notification, it may be notified by any one of image display and voice output that the vehicle speed of the vehicle is equal to or higher than a speed threshold value (for example, a legal speed limit).

Specifically, it is conceived that the notification control unit 32 notifies a driver that an occupant does not wear a seat belt as the reason for switching of the driving mode. In this case, in the simple notification, the driver is notified "that an occupant does not wear a seat belt." On the other hand, in the detailed notification, the driver is notified "that an occupant does not wear a seat belt" and of "position information of the occupant not wearing a seat belt." At this time, in the detailed notification, the occupant not wearing a seat belt may be notified "that the occupant does not wear a seat belt (that the driving mode is switched because the occupant does not wear a seat belt)" via the HMI 9.

In the simple notification the driver may be notified "that an occupant does not wear a seat belt" by image display on a display (display of characters or icons). In the detailed notification, the notification may be performed by voice output from a speaker in addition to the image display.

The notification control unit 32 applies a change of the notification style based on the automatic driving mode familiarity level to both of notification of switching of the driving mode and notification of the reason for switching of the driving mode. The notification control unit 32 may apply a change of the notification style to only a part of notification of switching of the driving mode and notification of the reason for switching of the driving mode. The notification control unit 32 may apply a change of the notification style to only notification of the reason for switching of the driving mode.

<Automatic Driving Mode Familiarity Level Evaluating Process of Vehicle Control System>

An automatic driving mode familiarity level evaluating process in the vehicle control system 200 according to the second embodiment will be described below. FIG. 6A is a flowchart illustrating a first example of an increase in an automatic driving mode familiarity level. The flowchart illustrated in FIG. 6A is performed whenever a predetermined period (for example, one day) elapses. The flowchart illustrated in FIG. 6A may be performed only when the engine stops.

As illustrated in FIG. 6A, in S70, the ECU 30 of the vehicle control system 200 recognizes the number of times in which the automatic driving mode start operation has been performed by a driver using the familiarity level evaluating unit 31. The familiarity level evaluating unit 31 recognizes the number of times in which the automatic driving mode start operation has been performed by each driver who has been personally authenticated.

In S72, the ECU 30 determines whether the number of times in which the automatic driving mode start operation has been performed by the driver is equal to or greater than a number threshold value using the familiarity level evaluating unit 31. When it is determined that the number of times in which the automatic driving mode start operation has been performed by the driver is not equal to or greater than the number threshold value (NO in S72), the ECU 30 ends the current process. When it is determined that the number of times in which the automatic driving mode start operation has been performed by the driver is equal to or greater than the number threshold value (YES in S72), the ECU 30 performs S74.

In S74, the ECU 30 increases the automatic driving mode familiarity level using the familiarity level evaluating unit 31. Thereafter, the ECU 30 ends the current process. The ECU 30 may stepwise increase the automatic driving mode familiarity level when the automatic driving mode familiarity level is equal to or greater than each number threshold value using a plurality of number threshold values having different values.

Figure 6B:
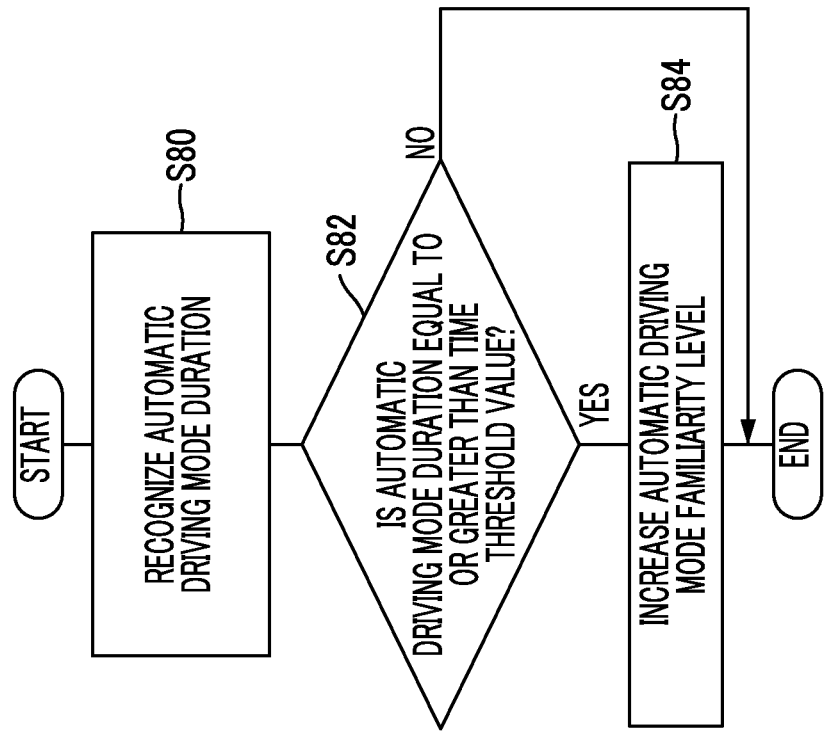
FIG. 6B is a flowchart illustrating a second example of an increase in an automatic driving mode familiarity level.
Figure 6A:
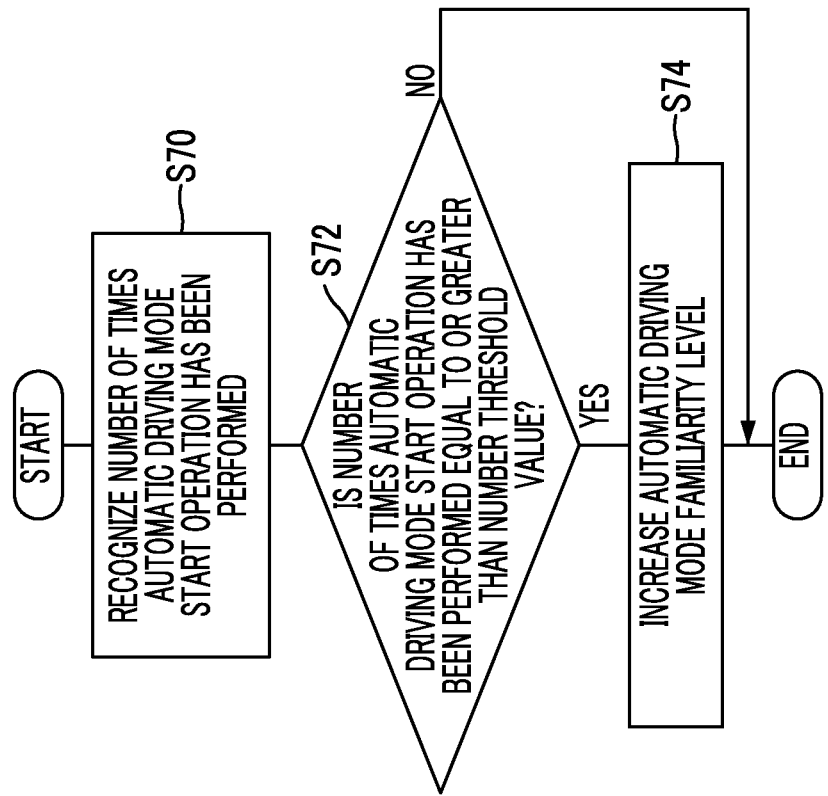
FIG. 6A is a flowchart illustrating a first example of an increase in an automatic driving mode familiarity level.

FIG. 6B is a flowchart illustrating a second example of the increase in an automatic driving mode familiarity level. Similarly to FIG. 6A, the flowchart illustrated in FIG. 6B is performed in a state in which the engine of the vehicle stops whenever a predetermined period elapses.

As illustrated in FIG. 6B, in S80, the ECU 30 of the vehicle control system 200 recognizes a driver's automatic driving mode duration using the familiarity level evaluating unit 31. The familiarity level evaluating unit 31 recognizes the automatic driving mode duration for each driver who is personally authenticated.

In S82, the ECU 30 determines whether the driver's automatic driving mode duration is equal to or greater than a time threshold value using the familiarity level evaluating unit 31. When it is determined that the driver's automatic driving mode duration is not equal to or greater than a time threshold value (NO in S82), the ECU 30 ends the current process. When it is determined that the driver's automatic driving mode duration is equal to or greater than a time threshold value (YES in S82), the ECU 30 performs S84.

In S84, the ECU 30 increases the automatic driving mode familiarity level using the familiarity level evaluating unit 31. Thereafter, the ECU 30 ends the current process. The ECU 30 may stepwise increase the automatic driving mode familiarity level when the automatic driving mode familiarity level is equal to or greater than each time threshold value using a plurality of time threshold values having different values.

<Notification Style Changing Process of Vehicle Control System>

Figure 7:
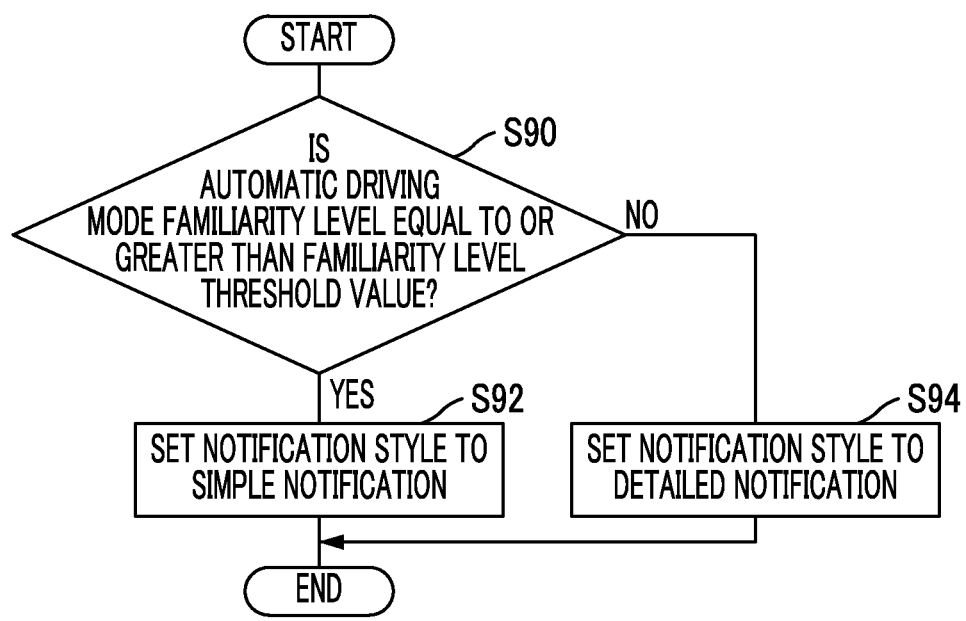
FIG. 7 is a flowchart illustrating a notification style changing process.

FIG. 7 is a flowchart illustrating a notification style changing process. The flowchart illustrated in FIG. 7 is performed when the value of the automatic driving mode familiarity level is changed.

As illustrated in FIG. 7, in S90, the ECU 30 determines whether the automatic driving mode familiarity level is equal to or greater than a familiarity level threshold value using the notification control unit 32. When it is determined that the automatic driving mode familiarity level is equal to or greater than the familiarity level threshold value (YES in S90), the ECU 30 performs S92. When it is determined that the automatic driving mode familiarity level is equal to or greater than the familiarity level threshold value (NO in S90), the ECU 30 performs S94.

In S92, the ECU 30 sets the notification style to the simple notification using the notification control unit 32. Thereafter, the ECU 30 ends the current process. In S94, the ECU 30 sets the notification style to the detailed notification using the notification control unit 32. Thereafter, the ECU 30 ends the current process.

<Operational Advantages of Vehicle Control System According to Second Embodiment>

According to the vehicle control system 200 according to the second embodiment, since the notification style for a driver is changed based on the automatic driving mode familiarity level which is a degree of familiarity of the driver with the automatic driving mode, it is possible to satisfactorily notify a driver who is not familiar with the automatic driving mode (for example, the detailed notification). According to the vehicle control system 200, it is also possible to avoid excessive notification to a driver who is familiar with the automatic driving mode.

While exemplary embodiments have been described above, the present disclosure is not limited to the above-mentioned embodiments. The present disclosure can be modified or improved in various forms based on knowledge of those skilled in the art in addition to the above-mentioned embodiments.

For example, the vehicle control system 100 does not need to recognize the occupant state. The switching of the driving mode due to the occupant state and the notification of the reason for switching of the driving mode is not essential. In this case, the vehicle does not need to include the driver monitor camera 6, the occupant detecting unit 7, and the occupant state recognizing unit 12. The notification device is not limited to the HMI 9.

When the driving mode of the vehicle is switched from the transition mode to the automatic driving mode or the manual driving mode, the vehicle control system 100 may not notify a driver of the reason for switching. When the driving mode of the vehicle is switched from the automatic driving mode to the manual driving mode, the vehicle control system 100 may not notify a driver of the reason for switching. The vehicle control system 100 does not have to notify a driver of the reason for not being maintained in the automatic driving mode.

The vehicle state has only to include at least one of the position of the vehicle, the traveling state of the vehicle, and the device state of the vehicle. The occupant state has only to include any one of the driver state and the seat belt wearing state. The driver state has only to include at least one of the steering wheel holding state of a driver, the alertness level of a driver, and a degree of concentration on driving of a driver. The driver state may include a posture of a driver instead of the wake-up level of a driver, and a degree of concentration on driving of a driver.

The automatic driving mode execution conditions may include a condition that fuel (an amount of power stored in case of an electric vehicle) stand up to a destination. In this case, the mode switching unit 15 determines whether fuel stands up to a destination using a known technique based on an amount of fuel remaining in the vehicle and a preset target route. When it is determined that fuel does not stand up to a destination, the mode switching unit 15 switches the driving mode of the vehicle to the transition mode, not to the automatic driving mode. By switching the driving mode of the vehicle to the transition mode in which a driver drives the vehicle, the driver can easily take a measure of finding out and entering a gasoline stand.

When fuel does not stand up to a destination, the mode switching unit 15 may maintain the driving mode of the vehicle in the automatic driving mode partway. In this case, the notification control unit 17 notifies the driver that fuel does not stand up to a destination. The notification control unit 17 may notify the driver of a travelable distance based on the amount of fuel remaining in the vehicle, or may notify the driver of an automatic driving mode maintainable distance. The mode switching unit 15 may determine that the automatic driving mode execution conditions are not satisfied, when fuel does not stand up to a destination and a fuel supply spot (for example, a gasoline stand) is not present within the travelable distance based on the amount of fuel remaining in the vehicle.

The automatic driving mode execution conditions may include an auxiliary condition in addition to necessary conditions. Examples of the auxiliary conditions include a condition which can be satisfied to improve reliability of control of the vehicle. The auxiliary conditions are common to the automatic driving mode execution conditions and the transition mode execution conditions. In a case in which the automatic driving mode start operation is performed, the mode switching unit 15 switches the driving mode of the vehicle of the automatic driving mode, when ten or more auxiliary conditions are satisfied after all the necessary conditions included in the automatic driving mode execution conditions are satisfied. In other words, when ten or more auxiliary conditions are not satisfied, the mode switching unit 15 does not determine that the automatic driving mode execution conditions are satisfied.

When all the necessary conditions of the automatic driving mode execution conditions are satisfied, but the number of auxiliary conditions is equal to or greater than five and less than 10, the mode switching unit 15 switches the driving mode of the vehicle to the transition mode, not to the automatic driving mode. When all the necessary conditions of the transition mode execution conditions are satisfied, but the number of auxiliary conditions is less than five, the mode switching unit 15 maintains the manual driving mode.

When the automatic driving mode start operation is not cancelled and the automatic driving mode execution conditions are not satisfied, the notification control unit 17 may display unsatisfied conditions among the automatic driving mode execution conditions on the display. The notification control unit 17 switches ON and OFF of normal display by a driver's setting operation (for example, operation of a display button). When a driver switches the normal display to OFF, but unsatisfied conditions are changed, the notification control unit 17 may perform re-display for a predetermined time. In addition, the notification control unit 17 may not normally display the unsatisfied conditions on the display, but may automatically end the display when a predetermined time elapses after the unsatisfied conditions are displayed.

The familiarity level evaluating unit 31 does not need to perform personal authentication of a driver. The familiarity level evaluating unit 31 may evaluate the automatic driving mode familiarity level of a driver based on the number of times in which the automatic driving mode has been executed. The number of times in which the automatic driving mode has been executed corresponds to the number of times in which the automatic driving mode has been performed during a predetermined period. When the number of times in which the automatic driving mode has been executed is equal to or a frequency threshold value, the familiarity level evaluating unit 31 increases the automatic driving mode familiarity level of the driver.

The familiarity level evaluating unit 31 may evaluate the automatic driving mode familiarity level based on a ratio of the automatic driving mode in traveling of the vehicle. The ratio of the automatic driving mode in traveling of the vehicle is a ratio at which the driving mode of the vehicle is the automatic driving mode after the engine of the vehicle is driven after the engine is stopped. When the ratio of the automatic driving mode in traveling of the vehicle is equal to or greater than a ratio threshold value, the familiarity level evaluating unit 31 increases the automatic driving mode familiarity level of the driver.

The familiarity level evaluating unit 31 may evaluate the automatic driving mode familiarity level without using a threshold value. The familiarity level evaluating unit 31 may evaluate the automatic driving mode familiarity level such that the automatic driving mode familiarity level have a larger value as the number of times in which the automatic driving mode start operation has been executed increases.

The same is true of the automatic driving mode duration, the number of times in which the automatic driving mode has been executed, and the ratio of the automatic driving mode.

The notification style in the second embodiment is not limited to the simple notification and the detailed notification. The notification control unit 32 can employ various known notification styles. The notification control unit 32 may select a notification style among three or more notification styles including the simple notification and the detailed notification.

The vehicle control system 100 may have one or more modes in addition to the automatic driving mode, the transition mode, and the manual driving mode. In this way, when the driving mode is switched, the vehicle control system 100 may notify a driver of the reason for switching. The vehicle control system 100 may display the automatic driving mode execution conditions or the transition mode execution conditions as a list on the display by a driver's operation regardless of the driving mode of the vehicle.

The vehicle control system 100 may has a logging function. The logging function is a function of recording particulars (a switching history) of the driving mode of the vehicle. In the logging function, the reason for switching the driving mode of the vehicle may be recorded. At this time, satisfied conditions and unsatisfied conditions among the automatic driving mode execution conditions may be recorded. The same is true of the transition mode execution conditions. The vehicle control system 100 may record data in a server, which can communicate with the vehicle control system 100, outside the vehicle.

What is claimed is:

1. A vehicle control system, the vehicle control system being configured to switch a driving mode of a vehicle among an automatic driving mode in which the vehicle travels by using a traveling plan created based on a predetermined target route, a transition mode in which the vehicle travels using cooperation between a driving operation of a driver of the vehicle and traveling control of causing the vehicle to travel by using the traveling plan, and a manual driving mode in which the vehicle travels based on an operation amount of the driving operation of the driver, the vehicle control system comprising:
   a notification device configured to notify the driver of information; and
   at least one electronic control unit (ECU) configured to:
      upon detection of a driving mode switch start command for switching the driving mode from a first mode among the automatic driving mode, the transition mode or the manual driving mode to a different second mode among the automatic driving mode, the transition mode or the manual driving mode:
      recognize a vehicle state of the vehicle and an occupant state of an occupant in the vehicle,
      when the recognized vehicle state and the recognized occupant state satisfy respective conditions of the second mode, switch the driving mode of the vehicle from the first mode to the second mode, and
      when the recognized vehicle state and the recognized occupant state do not satisfy each of the respective conditions of the second mode, cause the notification device to notify the driver of a reason that the driving mode of the vehicle was not switched to the second mode, the notification of the reason that the driving mode of the vehicle was not switched to the second mode including information regarding one or more of the respective conditions of the second mode that the at least one of the recognized vehicle state or the recognized occupant state did not satisfy.

2. The vehicle control system according to claim 1, wherein
   when the second mode is the automatic driving mode and the recognized vehicle state and the recognized occupant state do not meet each of the respective conditions of the automatic driving mode, the notification of the reason that the driving mode of the vehicle was not switched to the second mode includes a necessary condition to switch the driving mode of the vehicle to the automatic driving mode.

3. The vehicle control system according to claim 1, wherein
   the at least one ECU is further configured to:
      notify, when the driving mode of the vehicle is switched from the transition mode to the automatic driving mode based on the vehicle state, the driver of a reason for switching the driving mode of the vehicle from the transition mode to the automatic driving mode by using the notification device; and
      notify, when the driving mode of the vehicle is switched from the transition mode to the manual driving mode based on the vehicle state, the driver of a reason for switching the driving mode of the vehicle from the transition mode to the manual driving mode by using the notification device.

4. The vehicle control system according to claim 1, wherein
   the at least one ECU is further configured to:
      notify, when the driving mode of the vehicle is switched from the automatic driving mode or the manual driving mode to the transition mode based on the recognized occupant state, the driver of a reason for switching the driving mode of the vehicle to the transition mode by using the notification device.

5. The vehicle control system according to claim 4, wherein
   the at least one ECU is further configured to:
      notify, when the driving mode of the vehicle is switched from the transition mode to the automatic driving mode based on the recognized occupant state, the driver of a reason for switching the driving mode of the vehicle from the transition mode to the automatic driving mode by using the notification device; and
      notify, when the driving mode of the vehicle is switched from the transition mode to the manual driving mode based on the occupant state, the driver of a reason for switching the driving mode of the vehicle from the transition mode to the manual driving mode by using the notification device.

6. The vehicle control system according to claim 1, wherein
   the at least one ECU is further configured to:
      evaluate an automatic driving mode familiarity level, the automatic driving mode familiarity level being a degree of familiarity of the driver with the automatic driving mode; and
      change a notification style to the driver based on the automatic driving mode familiarity level.

7. The vehicle control system according to claim 6, wherein
   the at least one ECU is further configured to evaluate the automatic driving mode familiarity level, based on at least one of the number of times that the driver has executed the automatic driving mode and an accumulated time period during which the driving mode of the vehicle is the automatic driving mode.

8. The vehicle control system according to claim 6, wherein
the notification style includes an amount of information notified to the driver by the notification device.

9. The vehicle control system according to claim 1, wherein
the at least one ECU is further configured to:
when the vehicle travels in the automatic driving mode, determine whether the recognized occupant state and the recognized vehicle state satisfy a first condition and a second condition, the first condition and the second condition being different from each other;
maintain the automatic driving mode when the at least one ECU determines that the first condition and the second condition are satisfied;
switch the driving mode of the vehicle to the transition mode when one condition of the first condition and the second condition is satisfied and the other condition of the first condition and the second condition is not satisfied;
switch the driving mode of the vehicle to the manual driving mode when neither of the first condition and the second condition is satisfied;
notify the driver of a reason for switching the driving mode of the vehicle to the transition mode when the driving mode of the vehicle is switched to the transition mode; and
notify the driver of a reason for switching the driving mode of the vehicle to the manual driving mode when the driving mode of the vehicle is switched to the manual driving mode.

10. The vehicle control system according to claim 1, wherein
the at least one ECU is further configured to:
when the vehicle travels in the manual driving mode, determine whether the recognized occupant state and the recognized vehicle state satisfy a first condition and a second condition, the first condition and the second condition being different from each other;
switch the driving mode of the vehicle to the automatic driving mode when the at least one ECU determines that the first condition and the second condition are satisfied;
switch the driving mode of the vehicle to the transition mode when one condition of the first condition and the second condition is satisfied and the other condition of the first condition and the second condition is not satisfied;
maintain the manual driving mode when neither of the first condition and the second condition is satisfied;
notify the driver of a reason for switching the driving mode of the vehicle to the transition mode when the driving mode of the vehicle is switched to the transition mode; and
notify the driver of a reason for maintaining the manual driving mode when the manual driving mode is maintained.

11. The vehicle control system according to claim 1, wherein the respective conditions of the second driving mode include a vehicle state condition that is a condition based on at least one of: a vehicle speed of the vehicle, a steering angle of the vehicle, a change in a vehicle motion of the vehicle, or a camera of the vehicle.

12. The vehicle control system according to claim 1, wherein the respective conditions of the second driving mode include a vehicle state condition that is a condition based on at least one of: a vehicle speed of the vehicle, a steering angle of the vehicle, a change in a vehicle motion of the vehicle, a camera of the vehicle, one or more vehicle doors of the vehicle, a hood of the vehicle, a trunk of the vehicle, door mirrors of the vehicle, direction indicators of the vehicle, a headlight of the vehicle, a wiper of the vehicle, or a hand brake of the vehicle.

13. The vehicle control system according to claim 1, wherein the respective conditions of the second driving mode include a vehicle state condition that is a condition based on at least one of: a vehicle speed of the vehicle being lower than a speed threshold limit value, a steering angle of the vehicle being less than a steering angle threshold value, a change in a vehicle motion of the vehicle being less than a change threshold value, or a camera of the vehicle being in a normal state.

14. The vehicle control system according to claim 1, wherein the respective conditions of the second driving mode include a vehicle state condition that is a condition based on at least one of: vehicle doors of the vehicle are closed, a hood of the vehicle is closed, a trunk of the vehicle is closed, door mirrors of the vehicle are opened, direction indicators of the vehicle are turned off or are at least consistent with a current situation of the vehicle, a headlight of the vehicle is in an automatic ON mode, a wiper of the vehicle is in an automatic operation mode, or a hand brake of the vehicle is not be pulled.

15. The vehicle control system according to claim 1, wherein the respective conditions of the second driving mode include an occupant state condition that is a condition based on at least one of: whether the driver is currently holding a steering wheel of the vehicle, whether occupants of the vehicle are wearing seat belts, the driver's degree of concentration, the driver's alertness level or the number of occupants.

16. The vehicle control system according to claim 1, wherein the respective conditions of the second driving mode include an occupant state condition that is a condition based on at least one of: whether the driver is currently holding a steering wheel of the vehicle, whether occupants of the vehicle are wearing seat belts, the driver's degree of concentration on driving is equal to or greater than a driving concentration threshold value, the driver's alertness level is equal to or greater than an alertness level threshold value or the number of occupants is less than a fixed number.

17. A vehicle control system, the vehicle control system being configured to switch a driving mode of a vehicle among an automatic driving mode in which the vehicle travels by using a traveling plan created based on a predetermined target route, a transition mode in which the vehicle travels using cooperation between a driving operation of a driver of the vehicle and traveling control of causing the vehicle to travel by using the traveling plan, and a manual driving mode in which the vehicle travels based on an operation amount of the driving operation of the driver, the vehicle control system comprising:
a notification device configured to notify the driver of information; and
at least one electronic control unit (ECU) configured to:
upon detection of a driving mode switch start command for switching the driving mode from a first mode among the transition mode or the manual driving mode to a different second mode, which is the automatic driving mode:
recognize a vehicle state of the vehicle, when the recognized vehicle state satisfies a first condition, switch the driving mode of the vehicle from the first mode to the second mode, which is the automatic driving mode, and when the recognized vehicle state satisfies a second condition, but not the first condition, switch or maintain the driving mode of the vehicle to be the transition mode and cause the notification device to notify the driver of a reason that the driving mode of the vehicle was not switched to the automatic driving mode, the reason that the driving mode of the vehicle was not switched to the automatic driving mode including information regarding the first condition that the recognized vehicle state did not satisfy.

18. The vehicle control system according to claim 17, wherein the first condition and the second condition are the same type of condition, and the second condition is a more lenient condition than the first condition.

19. The vehicle control system according to claim 17, wherein the vehicle state condition is based on at least one of: a vehicle speed of the vehicle, a steering angle of the vehicle, a change in a vehicle motion of the vehicle, a camera of the vehicle, one or more vehicle doors of the vehicle, a hood of the vehicle, a trunk of the vehicle, door mirrors of the vehicle, direction indicators of the vehicle, a headlight of the vehicle, a wiper of the vehicle, or a hand brake of the vehicle.

20. The vehicle control system according to claim 17, wherein the vehicle state is based on at least one of: a vehicle speed of the vehicle being lower than a speed threshold limit value, a steering angle of the vehicle being less than a steering angle threshold value, a change in a vehicle motion of the vehicle being less than a change threshold value, or a camera of the vehicle being in a normal state.

\* \* \* \* \*